(12) United States Patent
Brunner et al.

(10) Patent No.: US 11,485,542 B2
(45) Date of Patent: Nov. 1, 2022

(54) UTILITY CONNECTIVITY SYSTEM

(71) Applicant: Keter Plastic Ltd., Herzliya (IL)

(72) Inventors: Yaron Brunner, Kibbutz Gvat (IL); Omer Menashri, Kibbutz Afikim (IL)

(73) Assignee: Keter Plastic Ltd., Herzliya (IL)

( * ) Notice: Subject to any disclaimer, the term of this patent is extended or adjusted under 35 U.S.C. 154(b) by 0 days.

(21) Appl. No.: 17/046,182

(22) PCT Filed: Jun. 6, 2019

(86) PCT No.: PCT/IL2019/050646
§ 371 (c)(1),
(2) Date: Oct. 8, 2020

(87) PCT Pub. No.: WO2019/239404
PCT Pub. Date: Dec. 19, 2019

(65) Prior Publication Data
US 2021/0031975 A1 Feb. 4, 2021

(30) Foreign Application Priority Data

Jun. 13, 2018 (IL) .......................................... 259990

(51) Int. Cl.
| | | |
|---|---|---|
| *B65D 21/02* | (2006.01) | |
| *B25H 3/02* | (2006.01) | |
| *B62B 3/02* | (2006.01) | |

(52) U.S. Cl.
CPC ......... *B65D 21/0228* (2013.01); *B25H 3/021* (2013.01); *B62B 3/02* (2013.01); *B65D 21/0212* (2013.01); *B65D 21/0224* (2013.01)

(58) Field of Classification Search
CPC ............ B65D 21/0228; B65D 21/0212; B65D 21/0224; B65D 21/0222; B25H 3/021; B62B 3/02
USPC ........................................................ 206/503
See application file for complete search history.

(56) References Cited

U.S. PATENT DOCUMENTS

| | | | | |
|---|---|---|---|---|
| 3,376,046 | A | * | 4/1968 | Kivett ...................... B62B 1/10 |
| | | | | 280/33.998 |
| 4,844,263 | A | * | 7/1989 | Hadtke ................ B65D 21/022 |
| | | | | 206/508 |
| 5,022,546 | A | | 6/1991 | Bock |
| 5,062,539 | A | * | 11/1991 | Chandler .............. B65F 1/0053 |
| | | | | 220/4.27 |
| D348,152 | S | | 6/1994 | Roeper et al. |
| 5,437,369 | A | | 8/1995 | Spitere |
| 5,699,925 | A | | 12/1997 | Petruzzi |
| D415,894 | S | | 11/1999 | Courville |
| 6,082,539 | A | | 7/2000 | Lee |
| D437,484 | S | | 2/2001 | Tiramani et al. |
| D439,407 | S | | 3/2001 | Parker |

(Continued)

FOREIGN PATENT DOCUMENTS

| | | |
|---|---|---|
| CN | 101558213 A | 10/2009 |
| CN | 201923584 U | 8/2011 |

(Continued)

*Primary Examiner* — Ernesto A Grano
(74) *Attorney, Agent, or Firm* — Vorys, Sater, Seymour and Pease LLP; Anthony P. Venturino; Maryellen Feehery Hank

(57) ABSTRACT

Provided is a utility connectivity system. More specifically the presently claimed subject matter is directed to connectivity systems associated with containers and utility units connectable to one another.

18 Claims, 28 Drawing Sheets

(56) References Cited

U.S. PATENT DOCUMENTS

| | | |
|---|---|---|
| D449,738 S | 10/2001 | Snider et al. |
| 6,371,320 B2 | 4/2002 | Sagol |
| D462,519 S | 9/2002 | Gaydos et al. |
| D467,424 S | 12/2002 | Hardigg et al. |
| D467,426 S | 12/2002 | Hardigg et al. |
| D493,284 S | 7/2004 | Lee |
| 6,761,366 B1 | 7/2004 | Klemmensen et al. |
| 6,874,634 B2 | 4/2005 | Riley |
| 6,889,838 B2 * | 5/2005 | Meier .................... B25H 3/021 206/508 |
| 6,983,946 B2 * | 1/2006 | Sullivan .................. B62B 1/002 206/511 |
| D520,237 S | 5/2006 | Cheng |
| D527,181 S | 8/2006 | Henning et al. |
| D564,216 S | 3/2008 | Thai |
| D572,479 S | 7/2008 | Buck et al. |
| 7,503,569 B2 | 3/2009 | Duvigneau |
| D600,912 S | 9/2009 | Brunner |
| D609,911 S | 2/2010 | Twig |
| D613,560 S | 4/2010 | Robichaud et al. |
| D629,607 S | 12/2010 | Sabbag et al. |
| D630,435 S | 1/2011 | Brunner |
| D630,851 S | 1/2011 | Landau et al. |
| 7,905,353 B2 | 3/2011 | Baker et al. |
| D636,994 S | 5/2011 | Okuda et al. |
| D643,217 S | 8/2011 | Pedersen |
| D647,300 S | 10/2011 | Shitrit et al. |
| D649,350 S | 11/2011 | Shitrit |
| D649,783 S | 12/2011 | Brunner |
| D653,832 S | 2/2012 | Vilkomirski et al. |
| 8,206,058 B2 | 6/2012 | Vrondran et al. |
| D663,952 S | 7/2012 | Crevling, Jr. et al. |
| D668,048 S | 10/2012 | Vilkomirski et al. |
| D674,605 S | 1/2013 | Vilkomirski et al. |
| 8,505,729 B2 * | 8/2013 | Sosnovsky ......... B65D 21/0228 206/508 |
| D693,121 S | 11/2013 | Bensman et al. |
| 8,590,704 B2 * | 11/2013 | Koenig .............. B65D 21/0223 206/508 |
| D694,522 S | 12/2013 | Horovitz |
| 8,602,217 B2 * | 12/2013 | Sosnovsky ......... B65D 21/0228 206/508 |
| 8,657,307 B2 * | 2/2014 | Lifshitz .................... B25H 3/02 280/47.18 |
| D700,777 S | 3/2014 | Shitrit et al. |
| D701,696 S | 4/2014 | Shitrit et al. |
| D701,697 S | 4/2014 | Sabbag et al. |
| D702,044 S | 4/2014 | Shitrit et al. |
| D703,436 S | 4/2014 | Sabbag et al. |
| D703,437 S | 4/2014 | Bar-Erez |
| D709,287 S | 7/2014 | Shitrit |
| D709,697 S | 7/2014 | Brunner |
| 8,789,699 B2 | 7/2014 | Patstone et al. |
| D710,098 S | 8/2014 | Horowitz |
| D710,100 S | 8/2014 | Brunner |
| D711,105 S | 8/2014 | Brunner |
| D713,639 S | 9/2014 | Whitlock et al. |
| 8,851,282 B2 | 10/2014 | Brunner |
| 8,875,888 B2 | 11/2014 | Koenig |
| D719,352 S | 12/2014 | Shitrit |
| D753,394 S | 4/2016 | Brunner |
| D753,395 S | 4/2016 | Brunner |
| D753,396 S | 4/2016 | Brunner |
| D753,397 S | 4/2016 | Brunner |
| 9,725,209 B1 * | 8/2017 | Ben-Gigi ............... B25H 3/021 |
| D804,819 S | 12/2017 | Faibish et al. |
| RE47,022 E * | 9/2018 | Sosnovsky ............... B25H 3/02 |
| D844,325 S | 4/2019 | Nelson |
| D857,386 S | 8/2019 | Shpitzer |
| 10,473,390 B2 * | 11/2019 | McCurry .............. F25D 31/005 |
| 10,583,962 B2 * | 3/2020 | Brunner ................. A45C 13/02 |
| 10,603,783 B2 * | 3/2020 | Brocket ................. B25H 3/021 |
| D898,320 S * | 10/2020 | Brunner ........................ D34/23 |
| 10,793,172 B2 * | 10/2020 | Brunner ................... B25H 3/02 |
| 11,077,506 B2 * | 8/2021 | Ender .................. B23D 47/025 |
| 2001/0030403 A1 | 10/2001 | Johnson et al. |
| 2004/0134818 A1 | 7/2004 | Cunningham et al. |
| 2007/0273114 A1 | 11/2007 | Katz |
| 2009/0145790 A1 | 6/2009 | Panosian et al. |
| 2009/0236255 A1 * | 9/2009 | Piacenza ................ B65D 45/22 206/508 |
| 2011/0181008 A1 | 7/2011 | Bensman et al. |
| 2012/0152944 A1 | 6/2012 | Vilkomirski et al. |
| 2012/0312812 A1 | 12/2012 | Sosnovsky |
| 2014/0102928 A1 | 4/2014 | Sabbag et al. |
| 2014/0197059 A1 | 7/2014 | Evans et al. |
| 2014/0375181 A1 | 12/2014 | Bar-Erez et al. |
| 2015/0376917 A1 * | 12/2015 | Brunner ............. A47B 87/0276 312/108 |
| 2017/0129097 A1 | 5/2017 | Engvall et al. |

FOREIGN PATENT DOCUMENTS

| | | |
|---|---|---|
| CN | 201990010 U | 9/2011 |
| CN | 102137795 B | 3/2013 |
| CN | 204161752 U | 2/2015 |
| CN | 107428436 B | 2/2020 |
| DE | 10-2007-032382 A1 | 1/2008 |
| DE | 20 2012 102 760 U1 | 1/2013 |
| JP | 6-255652 A | 9/1994 |
| WO | 2016/142935 A1 | 9/2016 |
| WO | 2016/178223 A1 | 11/2016 |
| WO | 2017/098513 A1 | 6/2017 |

* cited by examiner

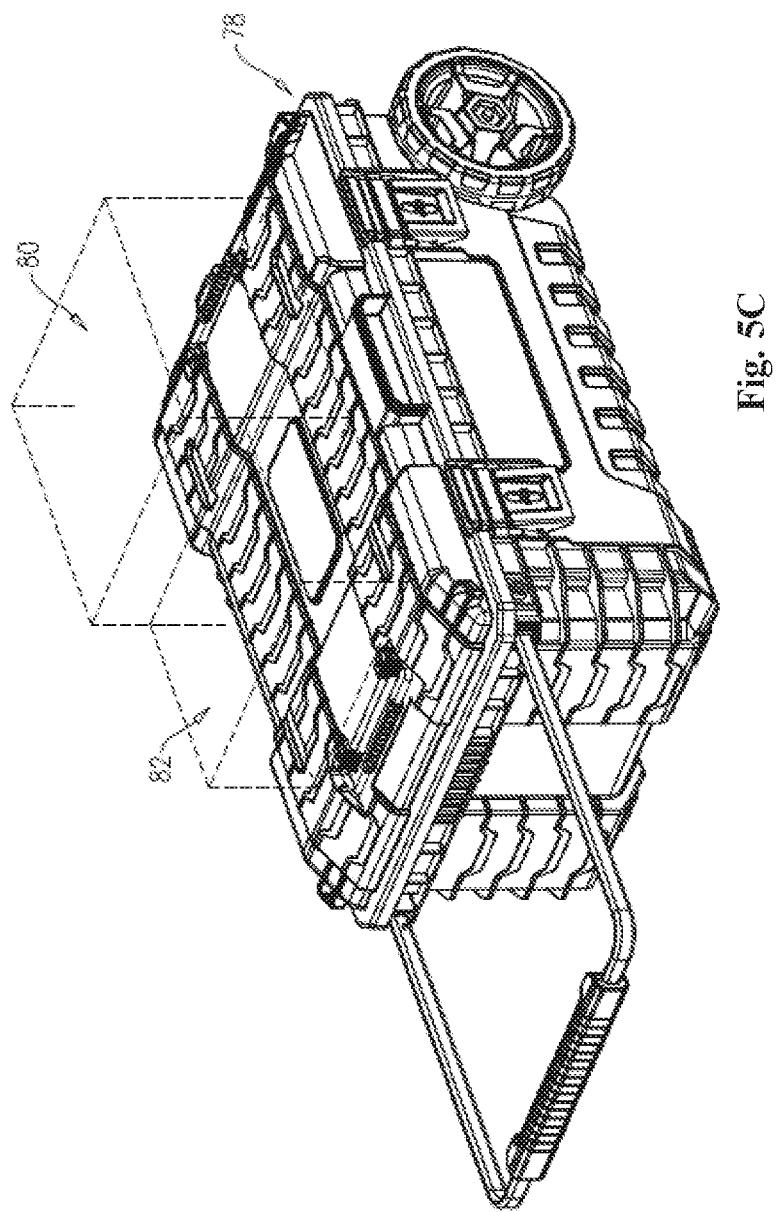

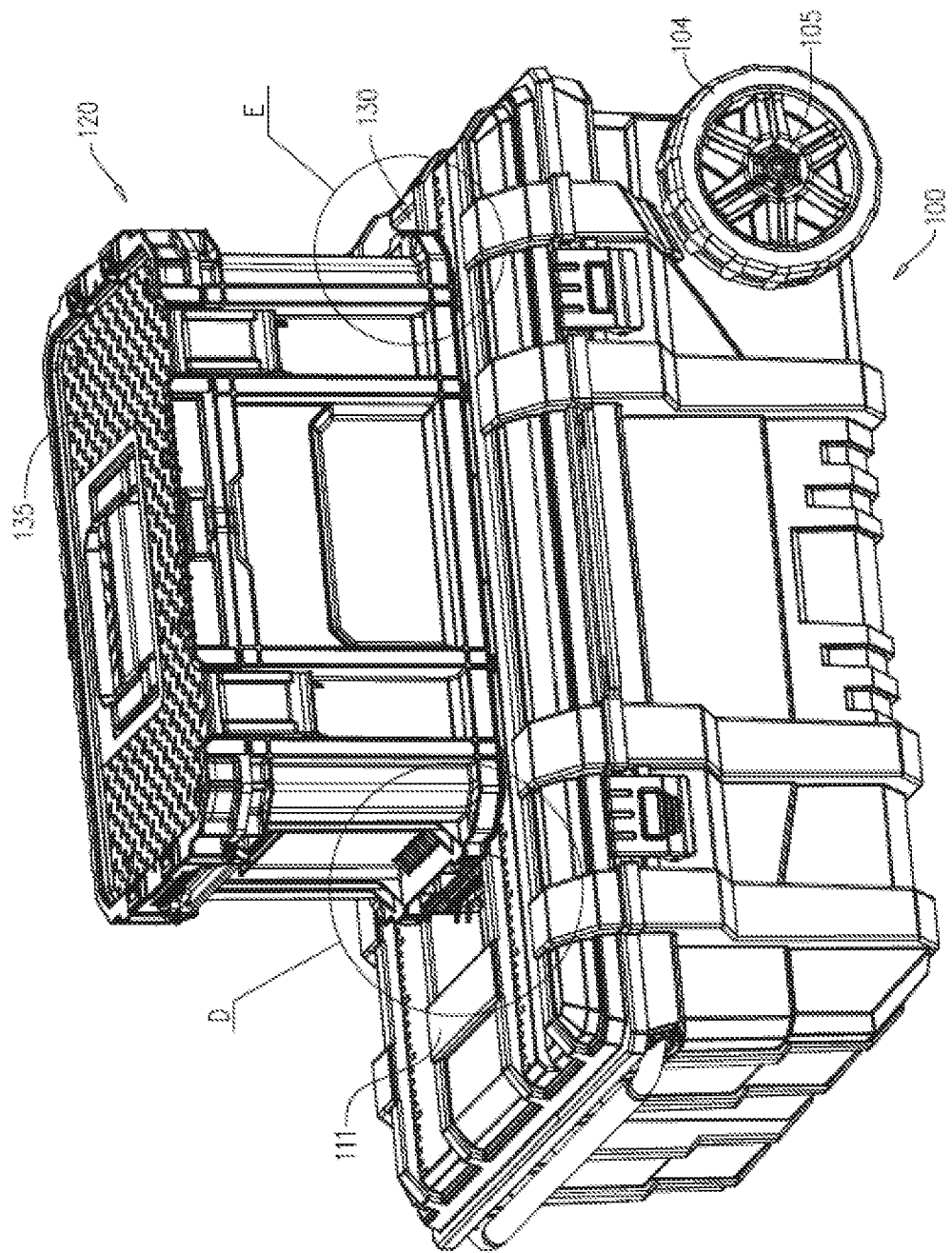

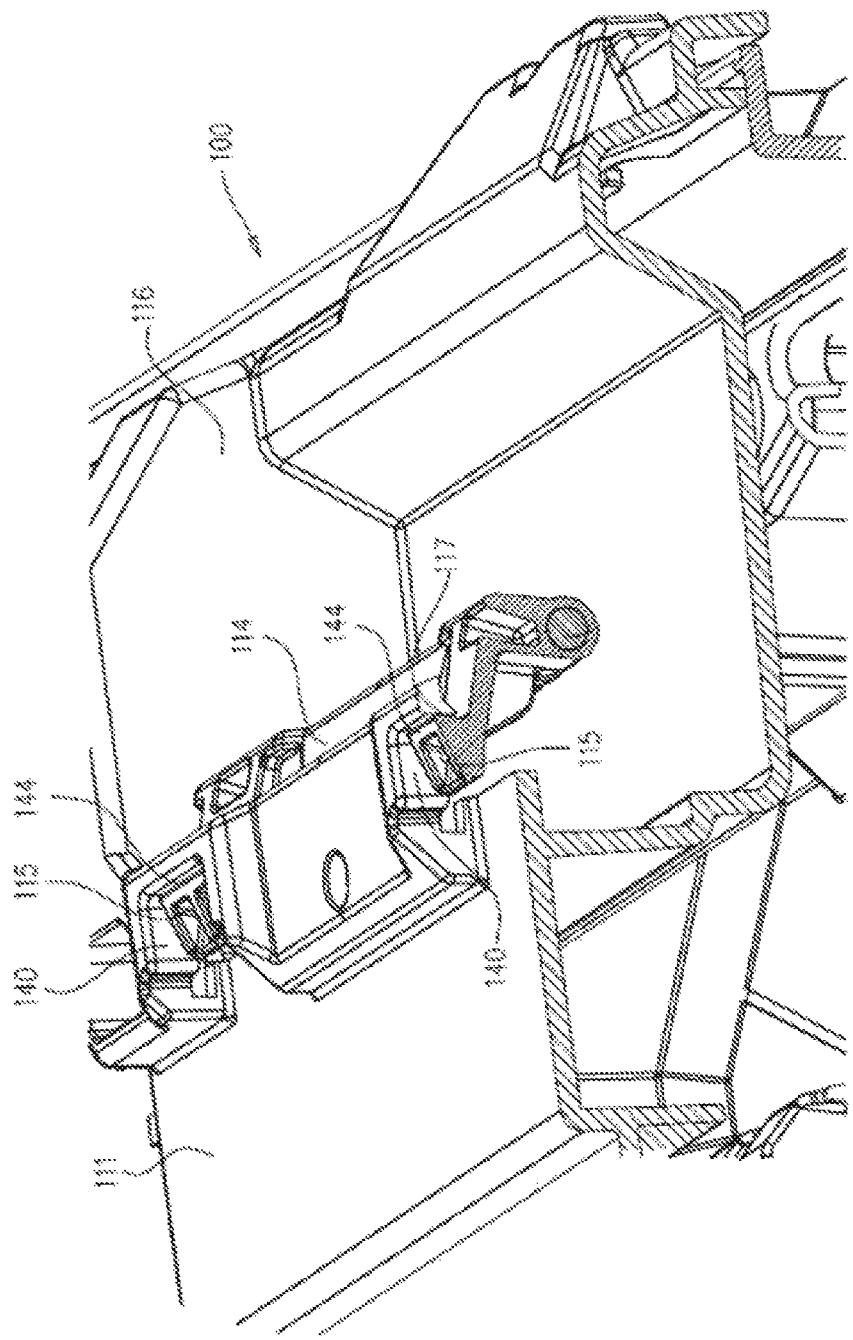

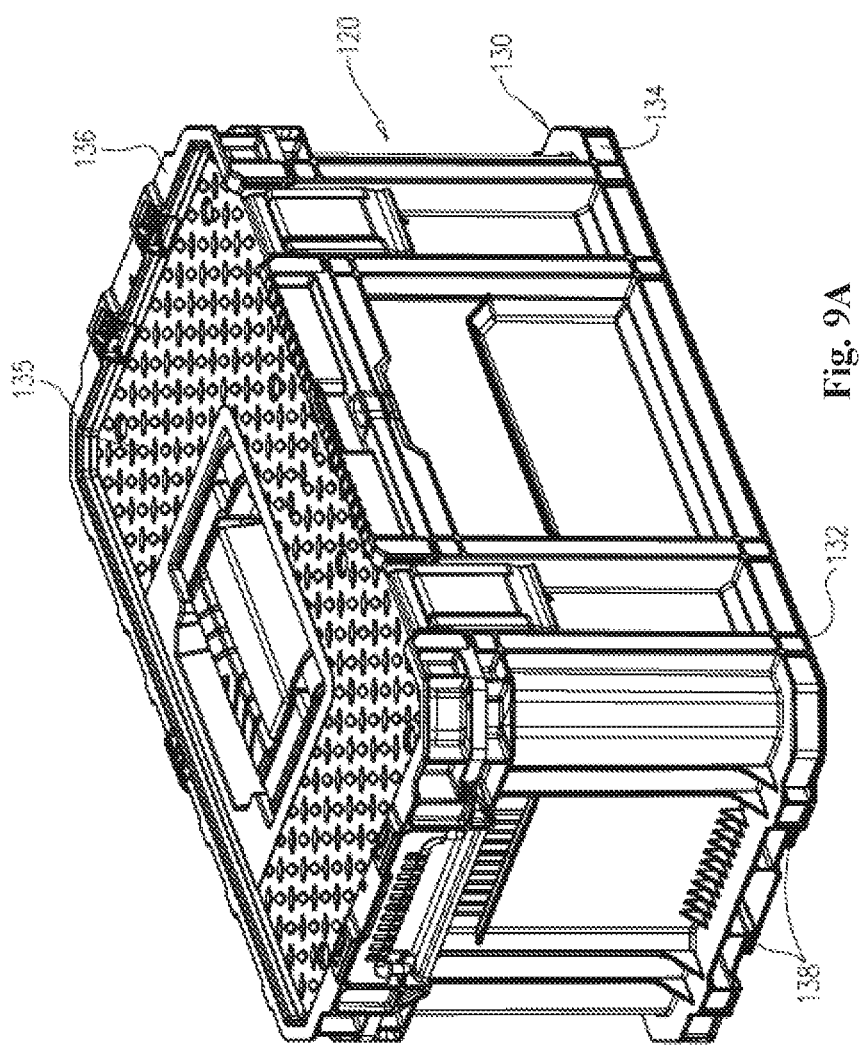

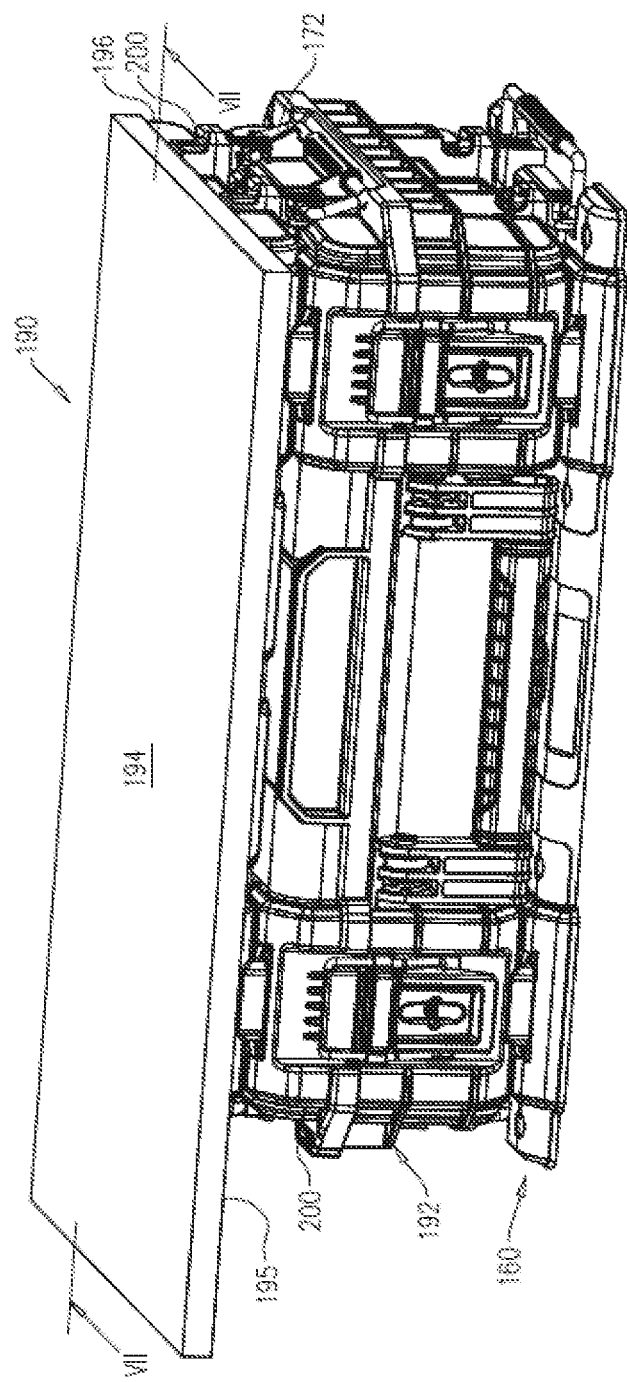

UTILITY CONNECTIVITY SYSTEM

TECHNOLOGICAL FIELD

The present disclosure is directed to a utility connectivity system. More specifically the present disclosure is directed to connectivity systems associated with containers and utility units connectable to one another.

BACKGROUND ART

References considered to be relevant as background to the presently disclosed subject matter are listed below:
WO2016142935
WO2107098513

BACKGROUND

WO2016142935 discloses a container assembly comprising a container for storage and transport of goods comprising at least one side wall and a bottom wall defining together an interior space and a cover for closing the opening, having a top surface, wherein the cover comprises at least one latch member movable between at least a first position and a second position and wherein the container comprises a retaining member on the at least one side wall and positioned parallel to the latch member such that the latch member is configured for engaging with a retaining member of another container to connect the container to the at least one other container.

WO2107098513 discloses a containers assembly comprising at least one first container and at least one second container, detachably attachable to one another by a sliding locking mechanism; said sliding locking mechanism interacts between the at least one first container and at least one second container, wherein the at least one first container is configured at a top portion thereof with a first locking member and the at least one second container is configured at a bottom portion thereof with a second locking member; such that when the second container rests over the first container, said first locking member and said second locking member are aligned and are configured for lockingly interacting with one another.

GENERAL DESCRIPTION

According to the present disclosure there is disclosed a utility connectivity system configured for detachably attaching a first utility unit to one or more second utility units.

The term utility unit as used herein in the specification and claims denotes any article of utility, either stationary of mobile, having a utility and being detachably attachable to other utility units. A utility unit according to the present disclosure can be, by way of example, any type of container, drawer shed, work surface, locomotion system, mounting system, and the like.

According to the present disclosure, there is provided a utility connectivity system comprising a first utility unit configured at a top portion thereof with a pair of pivoting latch members, each disposed near an opposite end of the first utility unit, and a second utility unit configured at a bottom portion thereof with a pair of spaced apart locking retaining members for detachable articulation with the pivoting latch members of the first utility unit, said first utility unit configured with a top bearing face and said second utility unit configured with a bottom bearing face, whereby the pivoting latch members can be arrested by the locking retaining members when the bottom bearing face bears over the top bearing face.

The pivoting latch members can be disposed at either or both of a top surface portion of the first utility unit and a top wall portion of opposite side walls of the first utility unit. The locking retaining members can be disposed at either or both of a bottom surface of the second utility unit and at a bottom wall portion of opposite side walls of the second utility unit.

Each second utility unit can constitute a first utility unit configured for detachably articulation thereover of another second utility unit, wherein the second utility unit is configured at a top portion thereof with a pair of pivoting latch members, each disposed near an opposite end of the second utility unit, and the another second utility unit is configured at a bottom portion thereof with a pair of spaced apart locking retaining members for detachable articulation with the pivoting latch members of the second utility unit, said second utility unit is configured with a top bearing face and said another second utility unit is configured with a bottom bearing face, whereby the pivoting latch members are arrested by the locking retaining members when the bottom bearing face bears over the top bearing face. Accordingly, an assembly of utility units can be detachably attachable on top of one another, comprising two or more containers detachably attached over one another. Accordingly, a plurality of utility units, e.g. containers, can be articulately stacked over one another.

According to an embodiment of the present disclosure, the utility connectivity system is a locomotion assembly, wherein the first utility unit is a locomotion body, whereupon mounting and articulating the second utility unit over the locomotion body facilitates wheeled locomotion of the locomotion assembly. According to an example of this embodiment, there is disclosed a container locomotion assembly, comprising a locomotion body and at least one container detachably attachable over said locomotion body, configured for locomoting the at least one container.

The locomoting unit may comprise a locomotion body configured at a bottom surface thereof with at least a first pair of wheels, and at a top portion thereof with a container coupling system, said container coupling system comprising at least one pair of latch members being pivotally displaceable about a first axis, between a locking position at which each of said latch members is engageable with a retaining member configured on a respective bottom portion of a container, and a stowed position at which said latch members are embedded within a latch receptacle of the locomotion body.

According to one particular embodiment, at the locking position the latch members project above a top surface of the locomoting unit.

According to another particular embodiment, at an assembled position, the locking retaining members of the container are at least partially received within the latch receptacle of the locomotion body.

According to one embodiment, the locomotion body is a container comprising a top cover, wherein the top surface is a top cover surface of the container, said top cover being pivotally hinged to a container body, wherein said cover is displaceable between a closed position and an open position, and further wherein a bottom surface of a base of the container is the bottom surface of said locomotion body.

According to another embodiment, the locomotion body is a dolly cart comprising a top surface, a bottom surface and side walls, said bottom surface is configured with two pairs of wheels. According to one example, the latch members are pivotally articulated at the top surface of the dolly cart. According to a second example, the latch members are pivotally articulated at the side walls of the dolly cart.

The locking latch members can be pivotally articulated to a top surface of the locomotion body or to opposite side walls thereof, and are pivotal such that, at the locking position, the locking latch members project above the top surface of the locomotion body so as to facilitate engaging with the locking retaining members on the respective side wall of the container, and at the stowed position said latch members substantially do not project from the top surface of the locomotion body.

According to another configuration, the locking latch members can be pivotally articulated to a top surface of the locomotion body or to opposite side walls thereof, and are pivotal such that at either the locking position and at the stowed position they do not project above the top surface of the locomotion body.

According to an aspect of the disclosure there is provided a locomotion dolly cart kit comprising a dolly cart body and an assembly kit comprising at least one pair of wheels and at least one pair of retrofit mounting units each comprising a latch member pivotally secured to an articulation member. The articulation member can be configured for attachment to a location of the dolly cart body, said location being configured such that the latch member is pivotally displaceable between a locking position when it projects from a top surface of the locomotion body and engageable with a retaining member configured on a respective side wall of a container, and a stowed position in which said latch member does not project from the top surface of the locomotion body.

According to another embodiment of the disclosure, there is provided a utility connectivity system, wherein the first utility unit is a mounting platform comprising a bottom face configured for articulation to a surface and a top bearing face for detachably articulating thereto a second utility unit, said mounting platform further configured with a pair of pivoting latch members for articulating with locking retaining members of a second utility unit. The pivoting latch members can be disposed at the top bearing face or at a top portion of opposite side walls of the mounting platform.

Any one or more of the following features, designs and configurations can be applied to a container locomotion unit according to the present disclosure:

- The second utility unit can be a container of any type, such as a toolbox;
- The first utility unit can be a container of any type, such as a toolbox;
- The footprint of second utility unit can be similar or larger or smaller than footprint of first utility unit;
- When attached over the first utility unit, the second utility unit can assume the same orientation as the first utility unit, or it can be rotated by 180° or by 90° or by 270°;
- The at least two latch members can be configured at the top surface of the locomotion body;
- The at least one pair of latch members can be configured at the side walls of the locomotion body;
- The at least one pair of latch members can be configured both at the top surface of the locomotion body and at the side walls of the locomotion body;
- The locomotion body can be configured with two or more pairs of latch members, wherein a latch member can cooperate with one or two other latch members, respectively, to thereby facilitate engaging with containers of different sizes and at modular configurations;
- The at least one pair of wheels can project from side walls of the locomotion body;
- The wheels of the locomotion body can comprise at least one pair of swivel wheels;
- The at least one pair of wheels can be disposed on an axis parallel to the first axis of pivot of the latch members;
- The latch members can be configured parallel to narrow side walls of the locomotion body;
- The latch members can be configured inwards from side edges of the top surface of the locomotion body;
- The locomotion body can be configured with a handle for carrying and manipulating thereof;
- The handle can be displaceable between a retracted position and a stowed position;
- At the stowed position the latch members can be configured not to project from the top surface of the locomotion body, or from a side wall of the locomotion body, respectively;
- In the absence of a container articulated to the locomotion body, the latch members can be pivoted into the locking position to function as carrying handles for carrying the locomotion unit;
- The latch members can be configured for arresting with respective locking retaining members of the container, wherein the locking retaining members are lateral projections configured with a hook-like portion for arresting the latch member, said locking retaining members being integrally formed on and outwardly protruding from respective side walls or from a bottom surface of the container;
- The latch members can be configured with a coating layer for increasing locking arresting of the locking retaining members and for cushioning when carrying the locomotion unit using the latch members as handles;
- Displacing the pair of latch members into the locking position can be facilitated place by pivotal displacement along said first axis, in opposite senses, towards one another, wherein one latch member of the pair pivots in a clockwise direction and the other latch of the pair pivots in a counterclockwise direction;
- The latch receptacle can be a depression formed at a top surface of the locomotion body;
- The latch receptacle can be a depression formed at a top surface of the locomotion body defined between four side walls and a bottom wall;
- The latch receptacle can be a depression formed at a top surface of the locomotion body defined by three walls and a bottom wall, and open towards a side wall of the locomotion body;
- The latch receptacle can be a depression formed at a side wall surface of the locomotion body;
- A lath member can be configured as a retrofit mounting unit on a locomotion body;
- A retrofit mounting unit can comprise a latch member pivotally secured to an articulation member, said articulation member configured for attachment to a location of a locomotion body, said location is configured such that the latch member is pivotally displaceable between a locking position at it projects from a top surface of the locomotion body engageable with a retaining member configured on a respective side wall of a container, and a stowed position at which said latch member is does not project from the top surface;
- The articulation member can be configured for snap articulation to the locomotion body;
- The second utility unit can be a workbench unit detachably attachable with the first utility unit;

The workbench unit can comprise a workbench platform and a connectivity unit, said connectivity unit configured at a bottom portion thereof with a pair of spaced apart locking retaining members for detachable articulation with the pivoting latch members of the first utility unit, and wherein said workbench platform can be integral with or attached to said connectivity unit;

The workbench unit can be configured with a smooth top surface and wherein all locking retaining members project bellow a bottom face of a workbench platform;

The workbench platform can be made of wood, or plastic material;

The workbench platform can be configured with piece working facilities, such for articulation thereof of different tools such as a vise, or power tools, machining facilities (sawing, cutting, drilling, grinding and the like) and the like;

The mounting platform can be configured for securing to any surface, such as a wall, a table top, a vehicle cargo bed and the like;

The mounting platform can be configured with a locking mechanism for locking the second utility unit when articulated thereto;

A top surface of the first utility unit and a bottom surface of the second utility unit can be configured with mating positioning members so that the second utility unit can be seated over the first utility unit at predefined position. Accordingly, one of a top surface of the first utility unit and a bottom surface of the second utility unit can be configured with positioning projections, and the other one of the top surface of the first utility unit and a bottom surface of the second utility unit can be configured with positioning depressions, said positioning projections and positioning depressions configured in register with one another. Accordingly, upon stacking a second utility unit over a first utility unit, it assumes a predefined position and is unlikely to misplace or spontaneity slide off.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 5A to 5C are examples of utility connectivity systems wherein utility units are articulated over a locomotion body, at different configurations;

FIG. 7B is an example of a utility connectivity systems wherein a utility unit is articulated over the locomotion body of FIG. 7A:

FIG. 7G is a sectioned view taken along line IV-IV in FIG. 7D, the locking retaining member at a locked position;

FIGS. 9A and 9B illustrate a top perspective view and a bottom perspective view, respectively, of a utility unit according to the example of FIGS. 7 and 8;

FIG. 15 is a top perspective view of a container articulated over a mounting platform and a workbench platform articulated over the container.

DETAILED DESCRIPTION OF EMBODIMENTS

Figure 1:
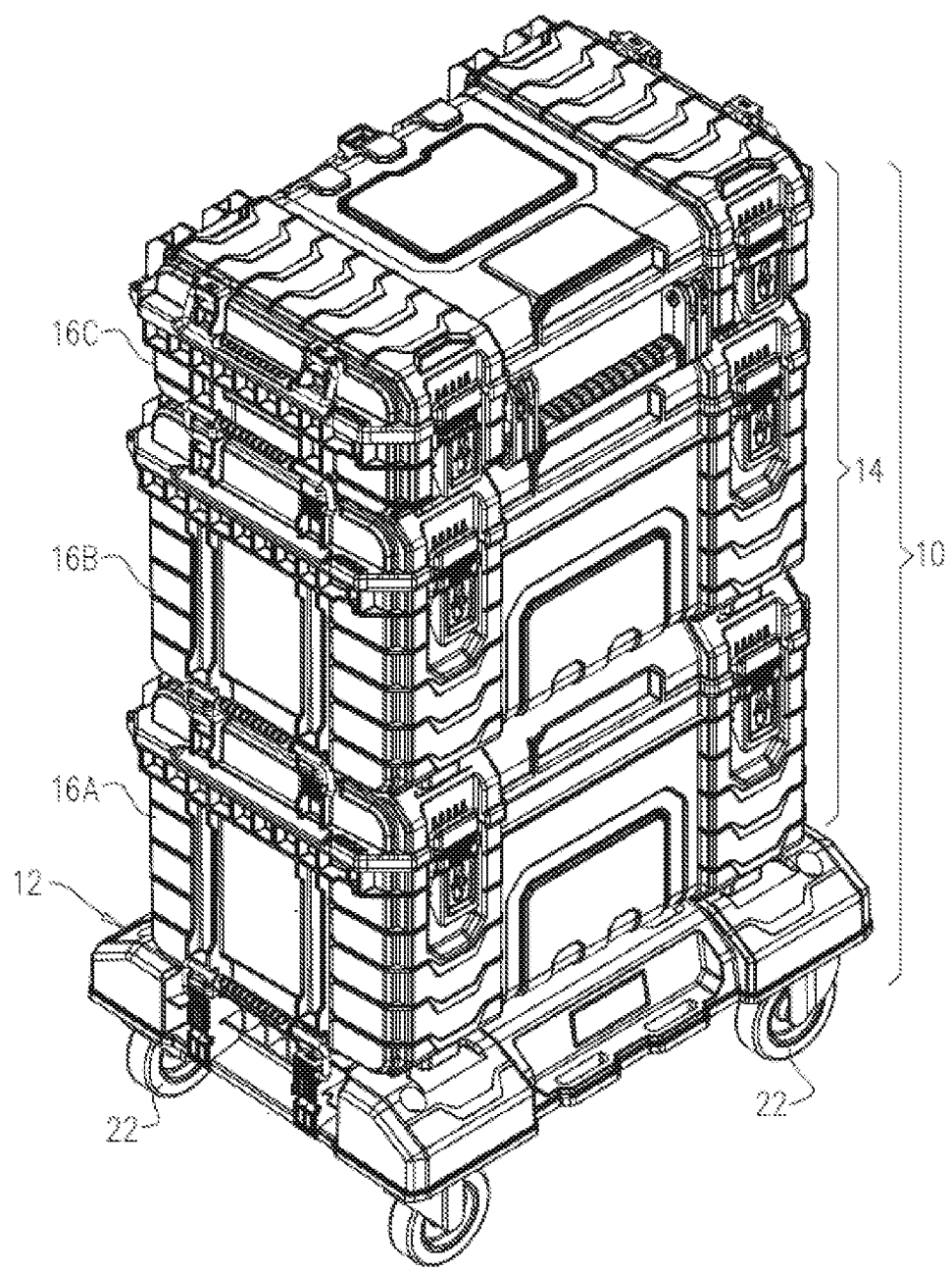
FIG. 1 is a perspective view of a of an articulated stack of containers mounted over a wheeled dolly cart according to an embodiment of the present disclosure.

Attention is first directed to FIG. 1 of the drawings illustrating a utility system generally designated 10 and comprising a dolly cart 12 with a stack of three utility units 14 articulately mounted over the dolly cart 12. The utility units 14 are three containers, e.g. tool or storage containers 16A, 16B and 16C, each articulated to a container below, respectively, and wherein the lowermost container 16A is in turn articulated over a top surface of the dolly cart 12, as will be discussed hereinbelow. It is appreciated that the utility units 14 can be article of utility as defined herein before, and each have a different size and footprint, however configured for respective articulation over one another, and over the dolly cart 12.

Whilst the description and drawings herein refer to utility units being containers, it should be appreciated that the scope of the disclosure is not to be restricted to same.

Figure 2A:
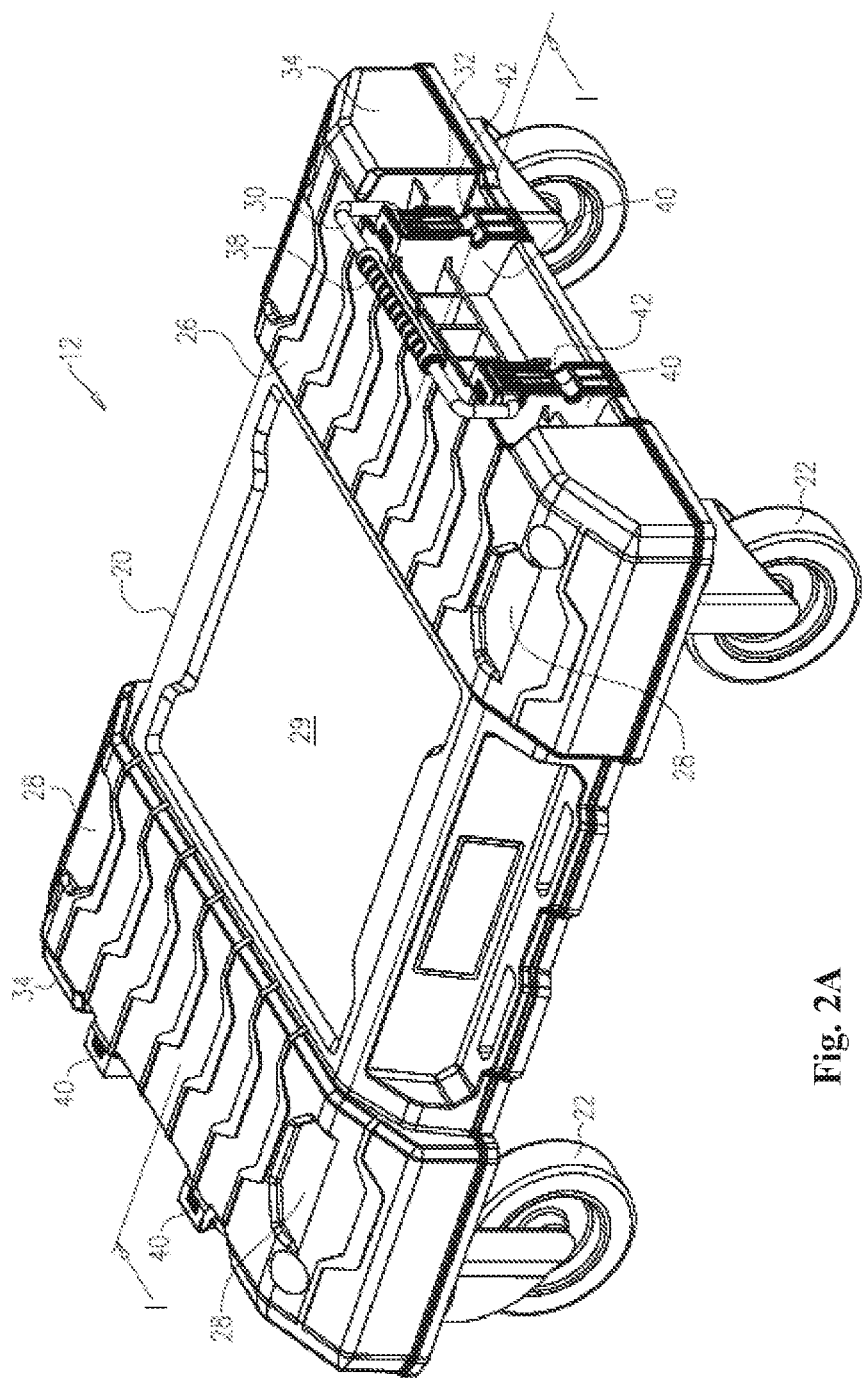
FIG. 2A is a top right perspective view of the dolly cart seen in FIG. 1.
Figure 2B:
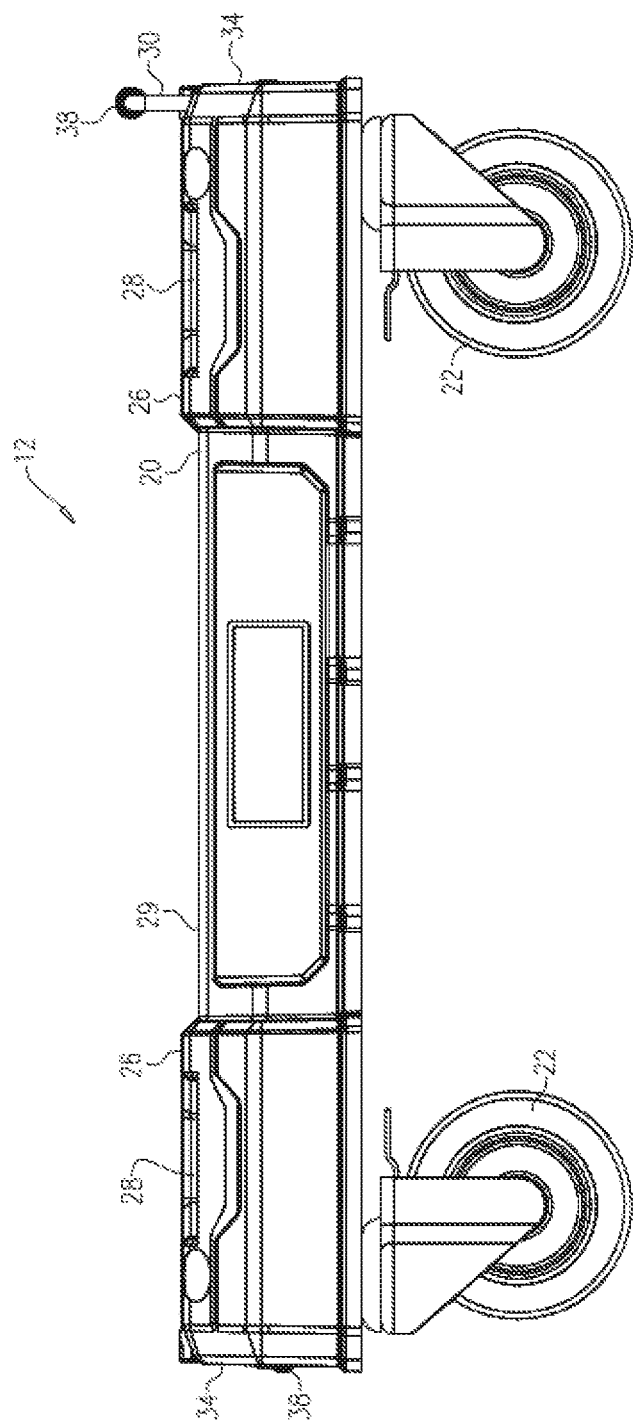
FIG. 2B is a front view elevation of the dolly cart of FIG. 2A.
Figure 2C:
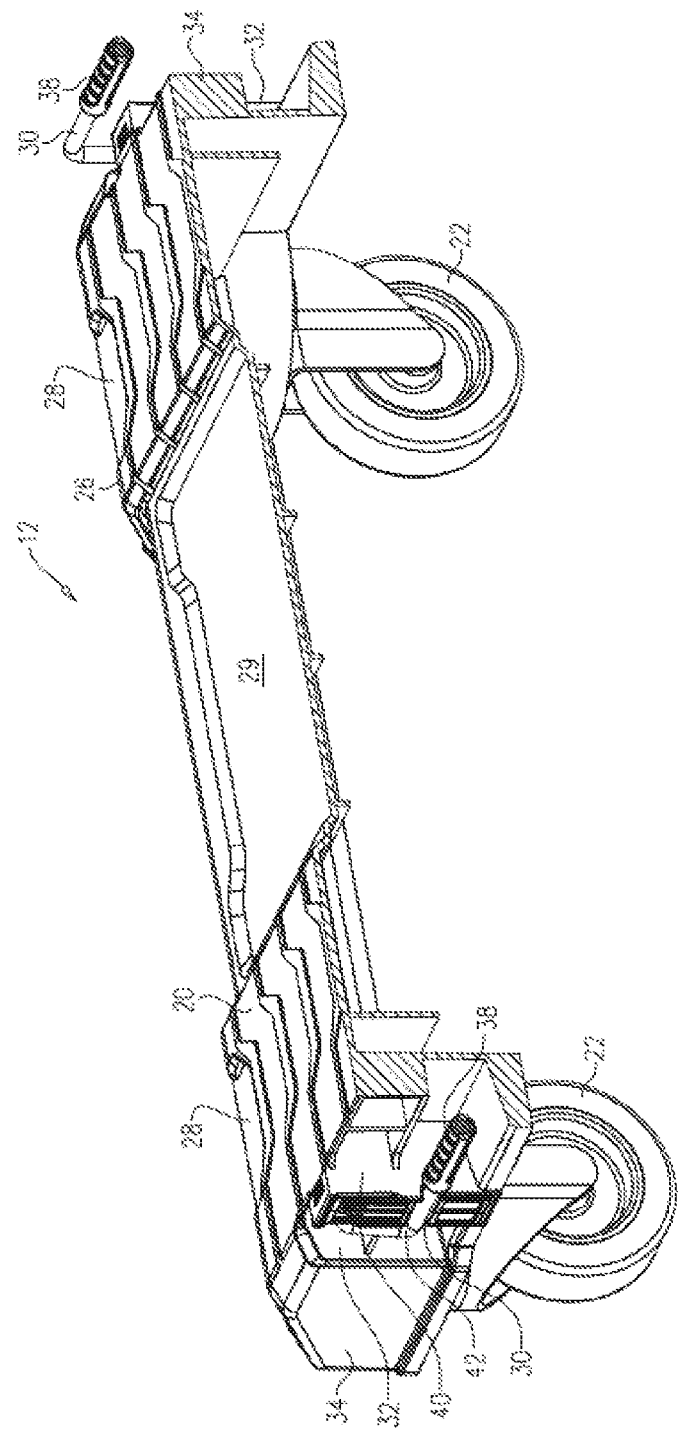
FIG. 2C is a top left perspective sectioned view, taken along line I-I in FIG. 2A.

FIGS. 2A to 2C are directed to the dolly cart 12, and it can be seen that the dolly cart comprises a mounting platform 20 configured with four caster wheels 22 articulated at a bottom surface of the dolly cart, with a top bearing face 26 configured with several utility unit positioning depressions 28 and 29. These are positioned and shaped in register with corresponding projections at a bottom surface of a second utility unit to be mounted thereover, e.g. container 16A as discussed in connection with FIG. 1.

The dolly cart 12 is further configured with a pair of pivoting latch members 30, each pivotally disposed within a niche 32 of a respective side wall 34 of the dolly cart 12, and configured for articulating with locking retaining members of a second utility unit (e.g. container 16A, and as will be discussed with greater detail with reference to FIGS. 6A and 6B). The pivoting latch members 30 are configured with a gripping portion 38 suited for comfort grabbing by an individual when carrying same, whereby the latch members constitute also carrying handles. The pivoting latch members 30 are pivotable between a collapsed position (left side latch member of FIGS. 2B and 2C), and a locking position (right side latch member of FIGS. 2B and 2C)

It is now appreciated that the second utility units, e.g. containers 16A to 16C illustrated in FIG. 1 and as will be discussed with reference to several figures hereinafter, are each configured with pivoting latch members 30 at respective side ends thereof or over a top bearing surface thereof, however disposed within a niche.

Figure 3:
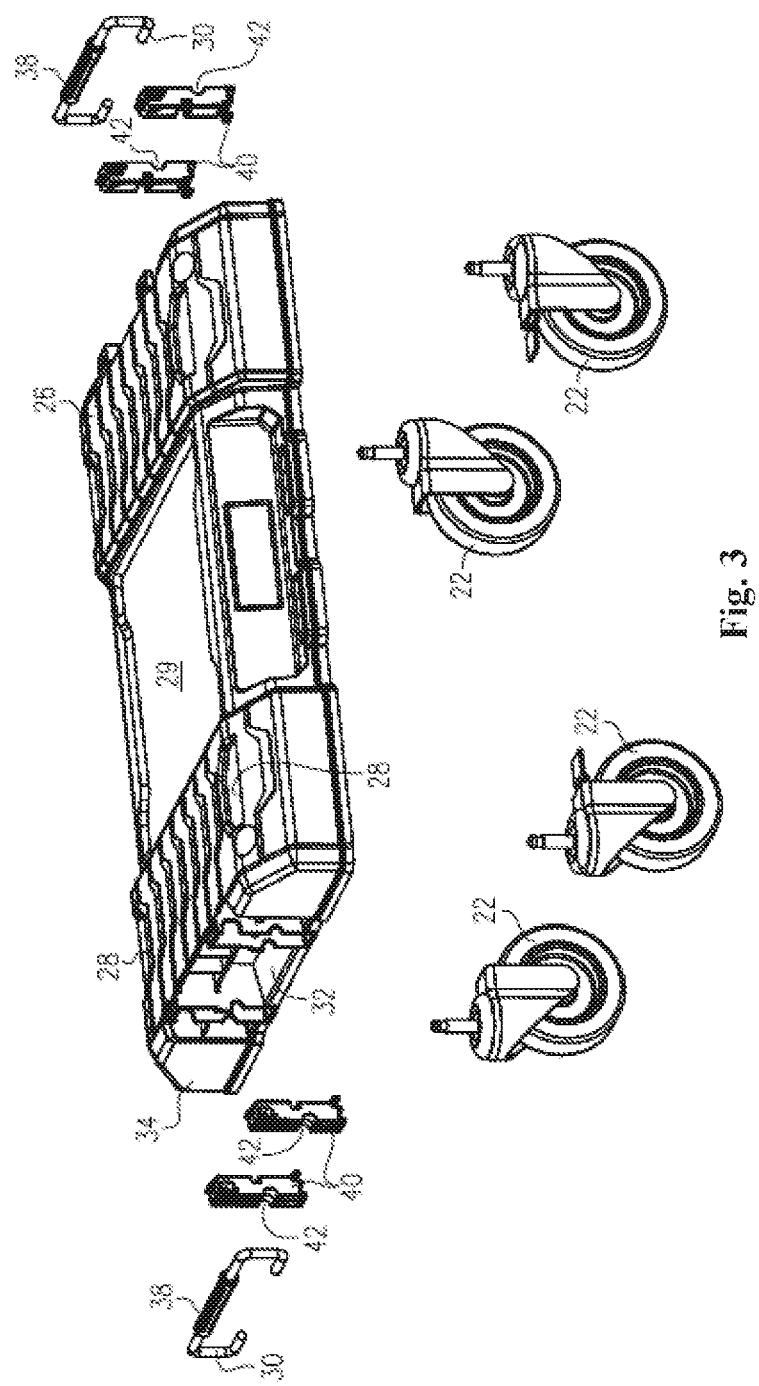
FIG. 3 is an exploded perspective view, of a dolly cart kit according to an embodiment of the disclosure.

As can be further seen, the pivoting latch members 30 are pivotally secured within the niche 32 by a pair of connectors 40, snappingly secured within the niche 32 and each configured with an indention 42 for at least partially receiving the pivoting latch members 30, whereby at the collapsed position the latch members 30 substantially do not project from the top bearing face 26 nor from the side walls 34. From the arrangement of FIG. 3 it can be realized that the connectors 40 with the pivoting latch members 30 can be configured as kit, rendering it suitable for attachment to other utility units, so as to readily convert them into a component utility unit of the utility connectivity system according to the present disclosure.

Figure 4:
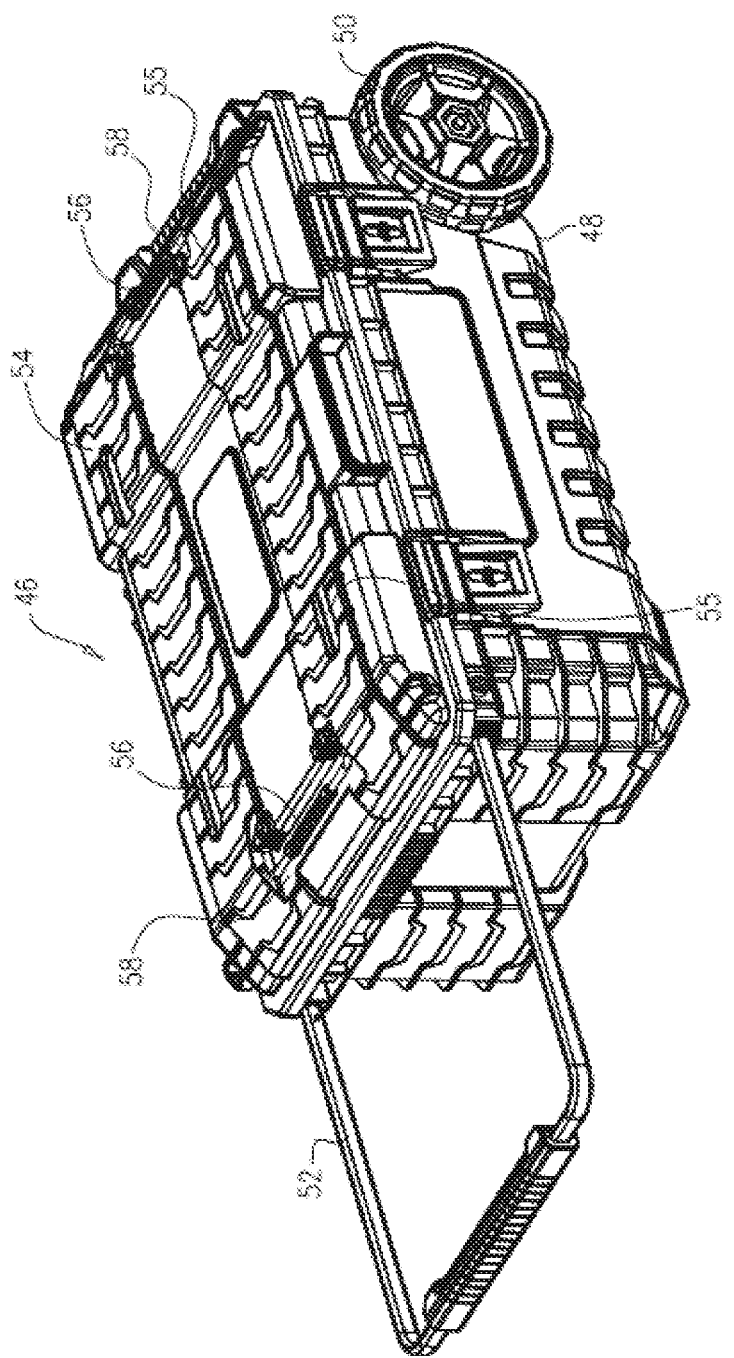
FIG. 4 is an example of a locomotion body used in a utility connectivity system according to the present disclosure.

Turning now to FIG. 4 of the drawings, there is illustrated a trolley-style first utility unit in the form of a rigid trolley-style wheeled container 46, comprising a rigid body 48 with a pair of locomotion wheels 50 at a base portion of the container, a telescopic handle 52 retractable from the body 48, and a pivotally secured top cover 54. The cover 54 comprises a bearing surface with shaped depressions 55 configured for receiving and supporting projections disposed at a bottom face of a second utility unit (not shown) to be mounted thereon, and further comprising a pair of pivoting latch members 56 spaced apart near side end portions of the cover 54 and disposed within a depressed niche 58, such that at a collapsed position, the latch members 56 substantially do not project from the top surface of the cover 54. The depressed niches 58 are configured with an opening facing the respective nearby side wall, whereby the pivoting latch members 56 are easily accessible also at the presence of a second utility unit over the first utility unit.

Figure 5A:
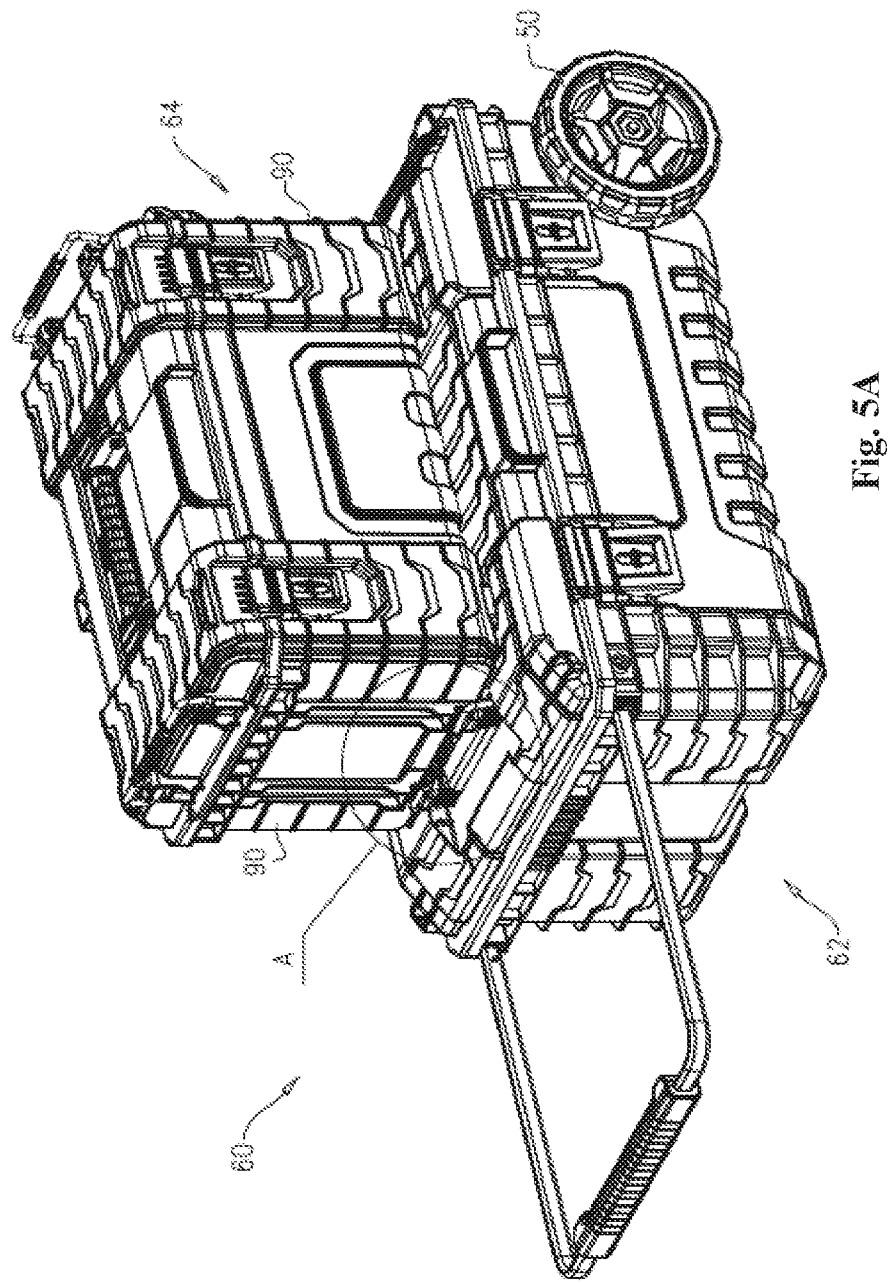
Figure 5B:
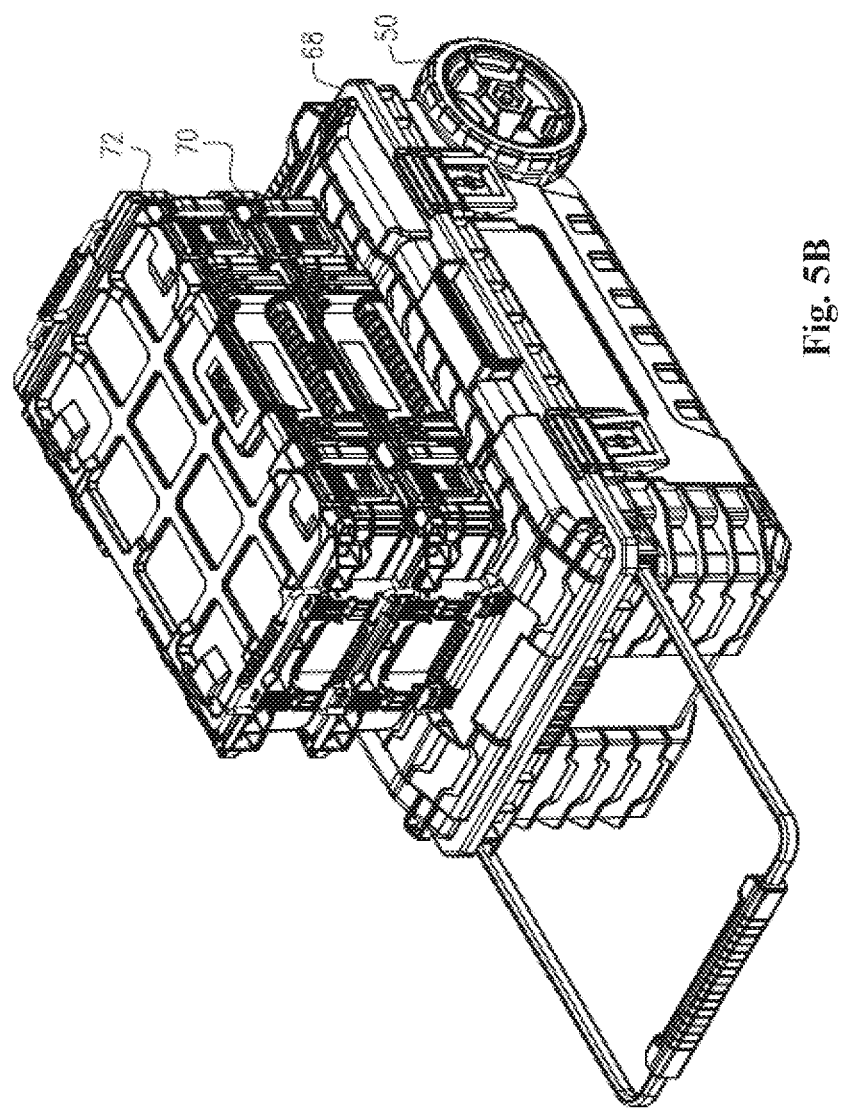

FIGS. 5A, 5B and 5C exemplify modularity of the connectivity system, wherein in FIG. 5A the system 60 comprises a first utility unit 62 (same as trolley-style wheeled container 46 of FIG. 4), and the second utility unit articulated thereover is a container (same as container 16B in FIG. 1), however with the footprint of the second utility unit being smaller than that of the first utility unit 62, and wherein the longitudinal axis of the two containers are disposed parallel to one another and perpendicular to an axis of the wheels 50. In FIG. 5B the first utility unit 68 (same as first utility unit 62 in FIG. 5A) and the second utility unit articulated thereover is an organizer box 70, and likewise is the third utility unit 72. Similar to the arrangement in FIG. 5A, the footprint of the second utility unit 70 (and 72) is smaller than that of the first utility unit 68. The arrangement of FIG. 5C discloses a first utility unit 78 (same as first utility unit 68 in FIG. 5B) and two second utility units 80 and 82 (schematically represented) and articulated over the first utility unit 78 at a side-by-side orientation, with the axis of the two second utility units 80 and 82 traversing the longitudinal axis of the first utility unit 68 (i.e. parallel to the axis of the wheels 50). However, the coupling arrangement of the utility units disclosed hereinabove in connection with FIGS. 5A to 5C is similar to the disclosure relating to previous examples and with particular reference being made now to FIGS. 6A and 6B.

Figure 6A:
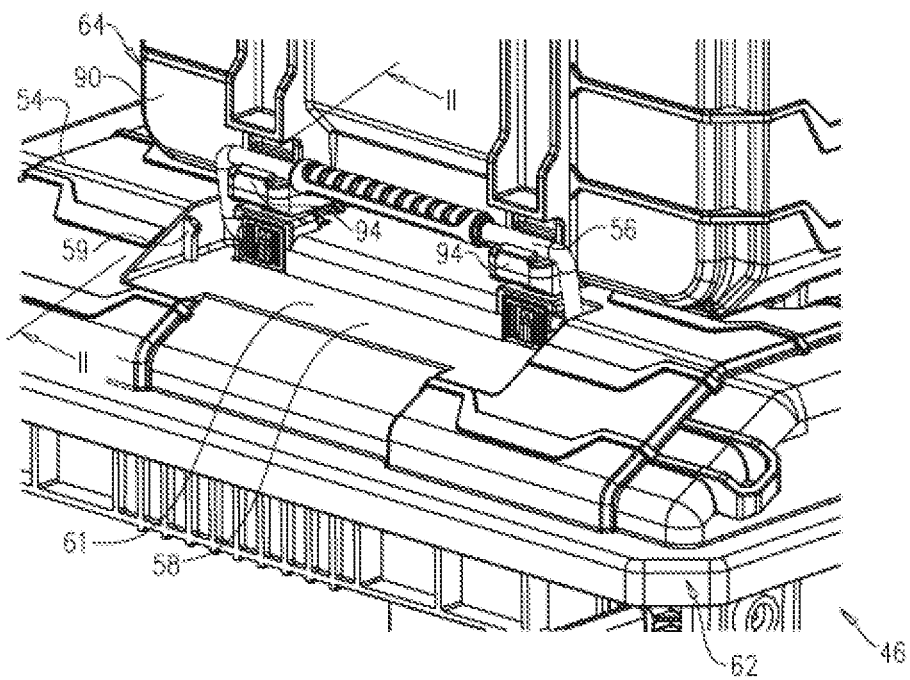
FIG. 6A is an enlargement of the portion marked A in FIG. 5A.
Figure 6B:
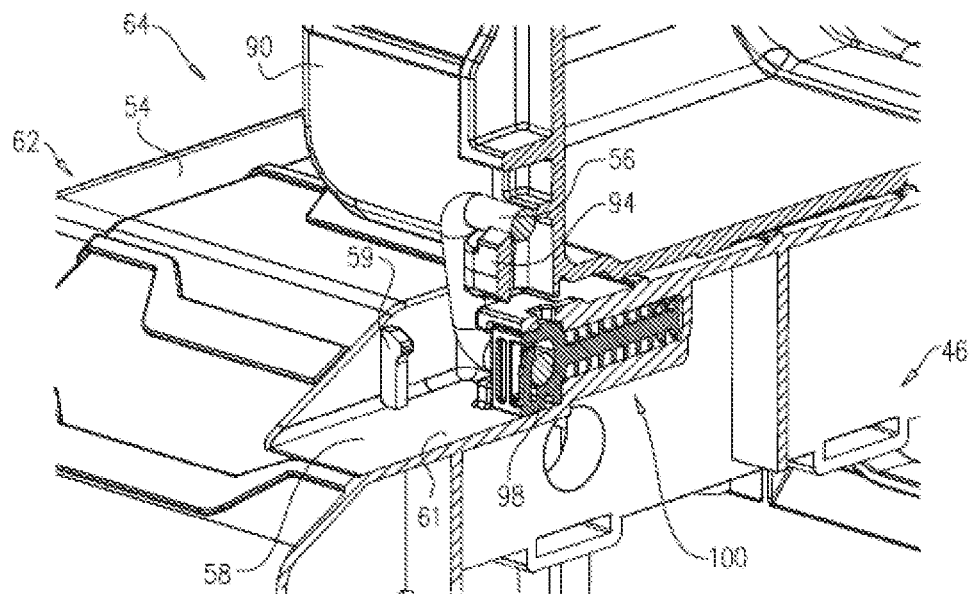
FIG. 6B is a section along line II-II in FIG. 6A.

As seen in FIG. 5A, and better in FIGS. 6A and 6B (being a close-up of detail A is FIG. 5A), each second utility unit (e.g. container 64) is configured at a bottom portion of its opposite side walls 90 with a retaining member 94 in the form of a pair of rigid upwards facing hook-like element integrally formed on and outwardly protruding from the respective side wall. The retaining member 94 can be in the form of a couple or more such hook-like elements (e.g. as in the illustrated example) or it can be a continuous element (not shown). The pivoting latch members 56 are pivotally articulated to the cover 54 at the niche 58, through a bushing support 98 comprising a spring biased plunger mechanism 100 configured for retaining the latch member 56 at a closed position, when not in use. Also noted, the niche 58 comprises an arresting rib 59 whereby when the latch members 56 is disposed at the unlocked position it is unlikely to spontaneously displace (i.e. it remains disposed substantially parallel over the base surface 61 of the niche 58 and not projecting therefrom)

In use, the latch members 56 are retained at the unlocked position (i.e. resting within the niche 58) and the second utility unit, namely container 64 of the present example, is placed over the first utility unit, namely trolley 46. Once positioned in place, the latch members 56 are pivoted upwards towards one another so as to engage and arrest with the retaining members 94, whereupon the second utility unit is articulated over the first utility unit and they can now be locomoted unitarily. Likewise, a third utility unit can now be articulated over the second utility unit (e.g. as in the example of FIG. 1 or 5B). Detaching the second utility unit from the first utility unit is easily facilitated by pivotal displacing the latch members 56 into their resting, unlocked position (FIG. 4). It is noted that upon displacing the latch members 56 into the locked position they snap into arresting by the respective retaining members 94, whilst unlocking requires applying some force so as to overcome the arresting bulge at the tip of the retaining members 94.

Further attention is now directed to FIGS. 7A to 9B of the drawings, illustrating another example of a utility connectivity system according to the disclosure.

A trolley-style first utility unit in the form of a rigid trolley-style wheeled container 100, comprising a rigid body 102 with a pair of locomotion wheels 104 disposed at a base portion of the container and rotatable about an axis 105, a telescopic handle 106 retractable from the body 102, and a pivotally secured top cover 110. The cover 110 has a bearing surface 111 comprising a pair of pivoting latch members 114 spaced apart and disposed within a depressed niche 116, such that a major portion of the latch members 56 extends within the niche 116 (at either a locked/unlocked position thereof), however with only locking tongue projecting over the bearing surface 111, as will be discussed. Each pivoting latch members 114 comprises a pair of tongue-like locking latches 115 (seen in FIGS. 7C-7D). The pivoting latch members 114 are pivotally articulated to the cover 110 through axel disposed parallel to the wheels axis 105.

Figure 7A:
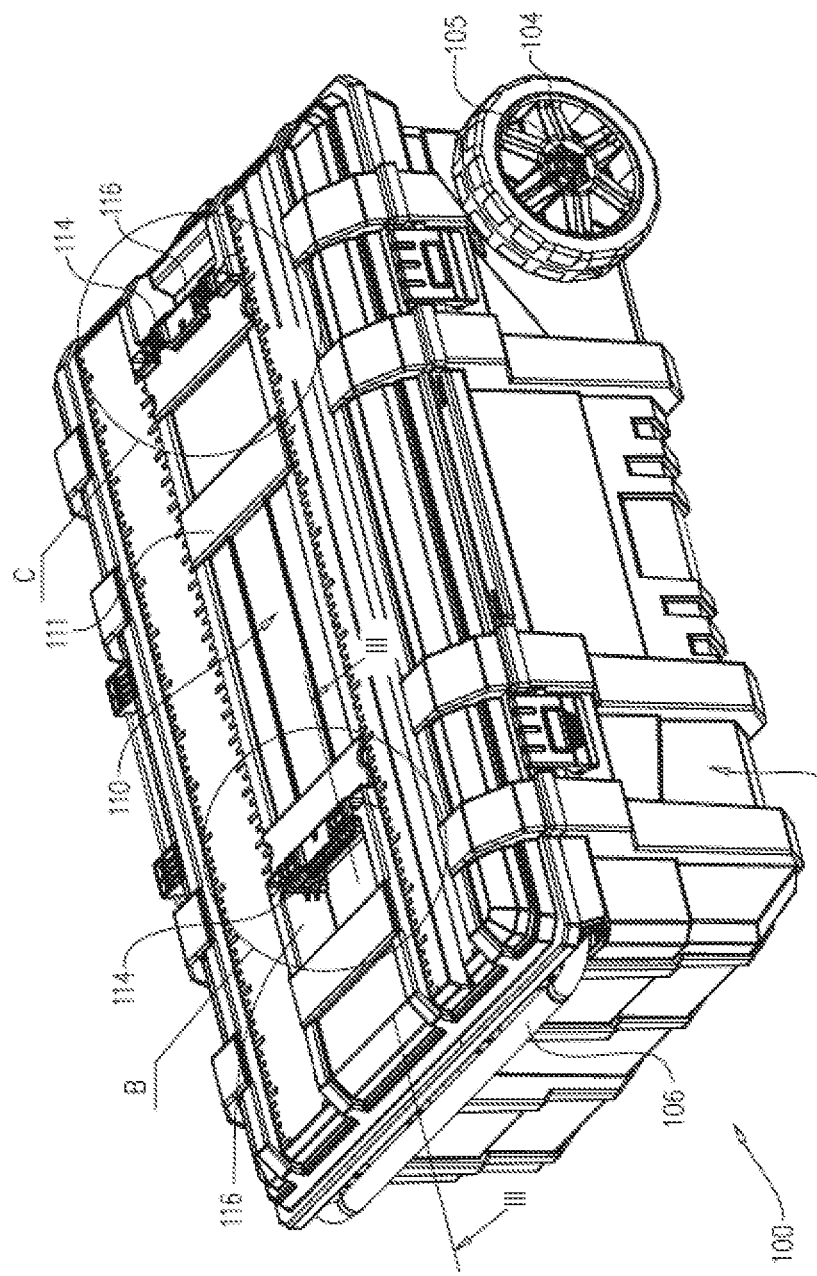
FIG. 7A is a perspective view of another locomotion body.
Figure 7C:
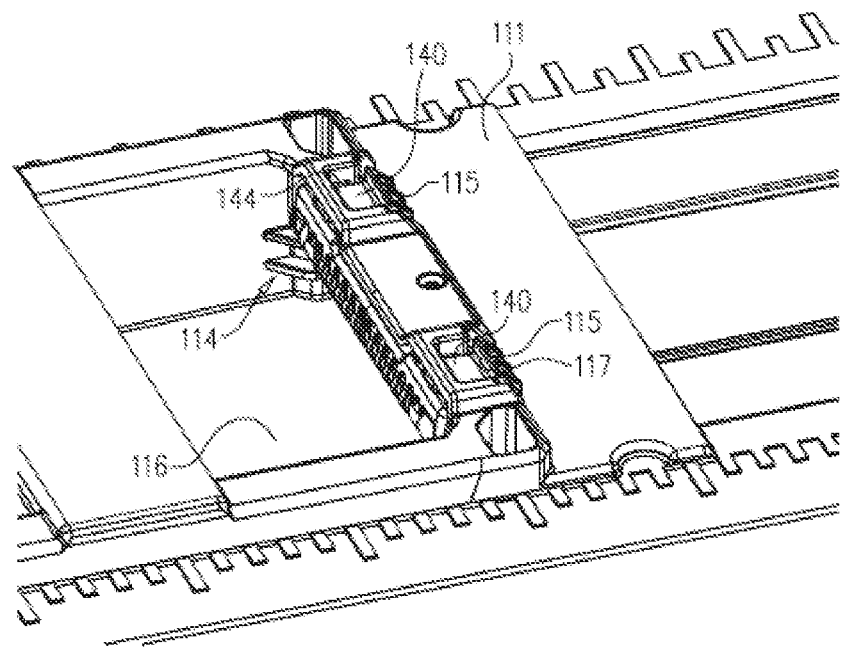
FIG. 7C is an enlargement of the portion marked B in FIG. 7A, the locking retaining member at a locked position.
Figure 7D:
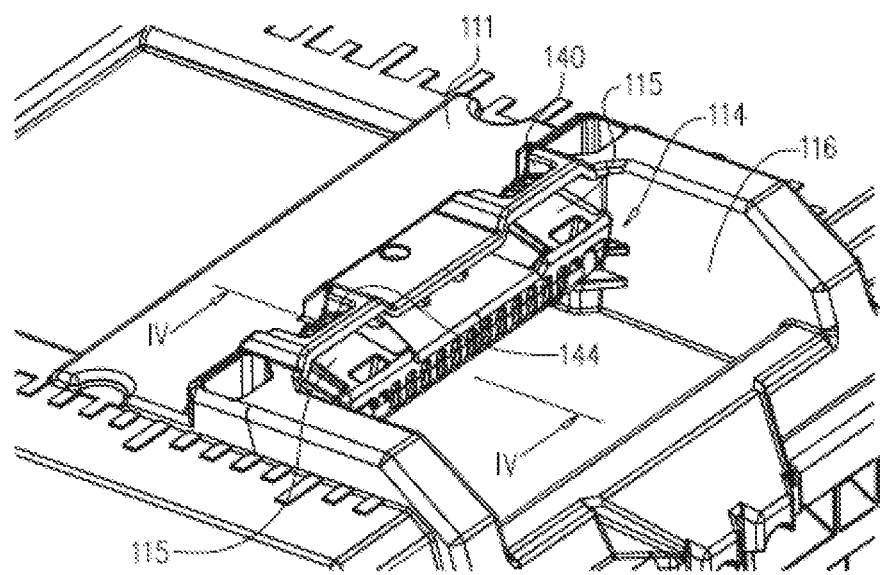
FIG. 7D is an enlargement of the portion marked C in FIG. 7A, the locking retaining member at an unlocked position.
Figure 7E:
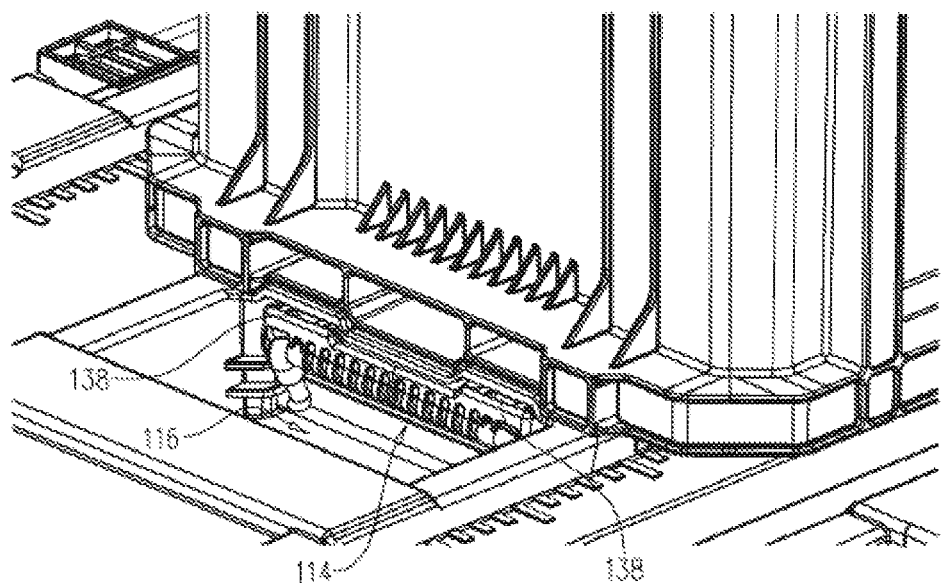
FIG. 7E is an enlargement of the portion marked D in FIG. 7B.
Figure 7F:
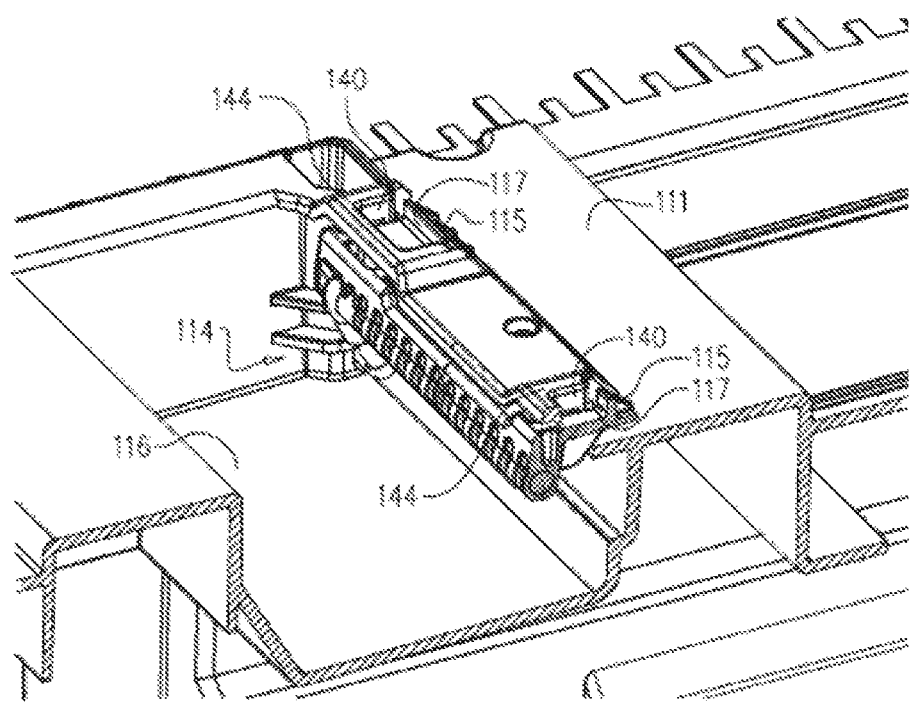
FIG. 7F is an enlarged section taken along line III-III in FIG. 7A.
Figure 8A:
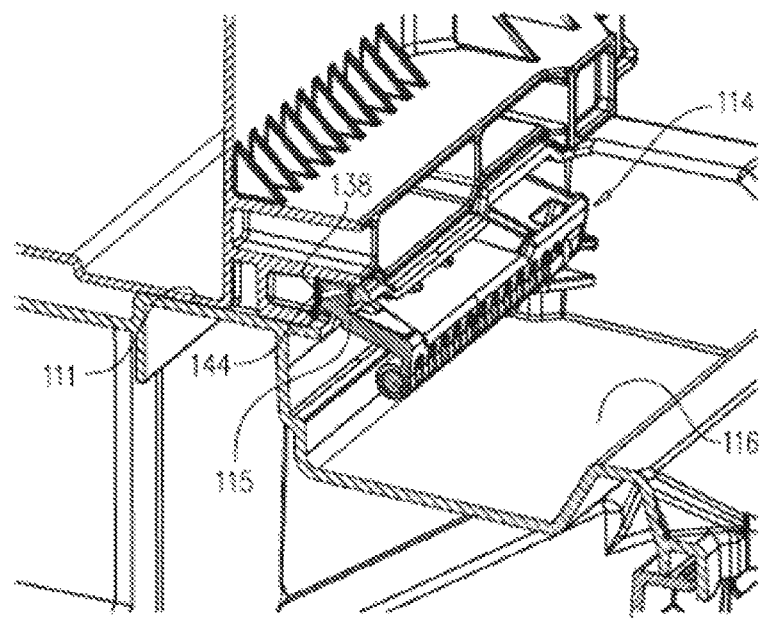
FIGS. 8A and 8B are sectioned views through the portion marked E in FIG. 7B, the locking retaining member at an unlocked position and at a locked position, respectively.
Figure 8B:
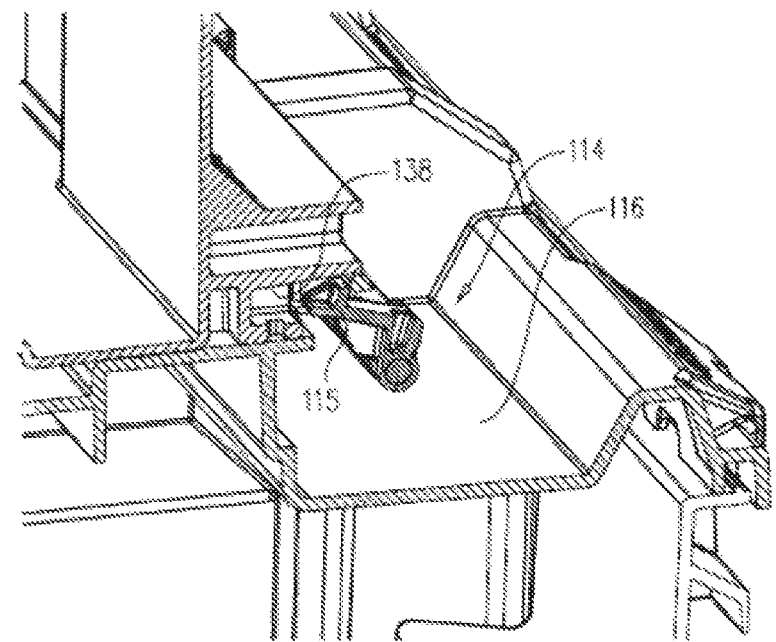

As seen in FIG. 7A, the right side niche 116 is configured also with an opening facing the respective nearby side wall, however wherein both pivoting latch members are easily accessible also at the presence of a second utility unit (120; FIG. 7B) over the first utility unit 100.

Figure 9B:
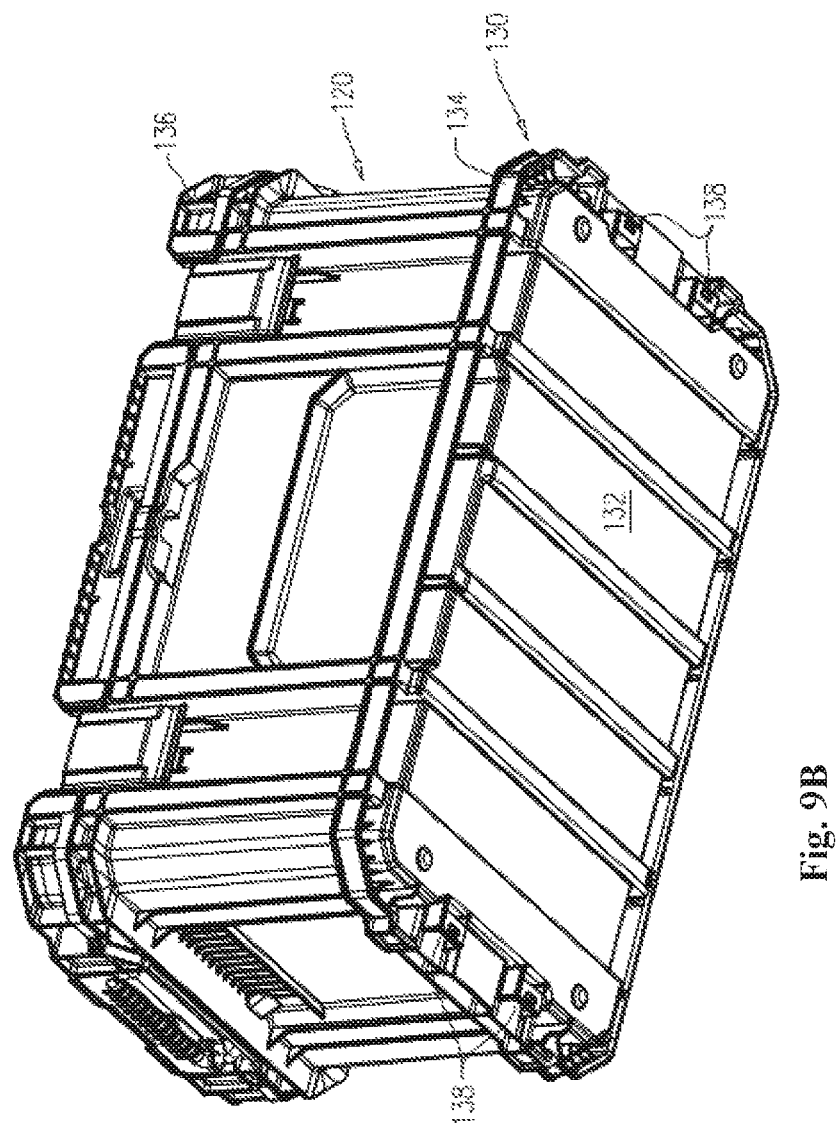
Figure 10:
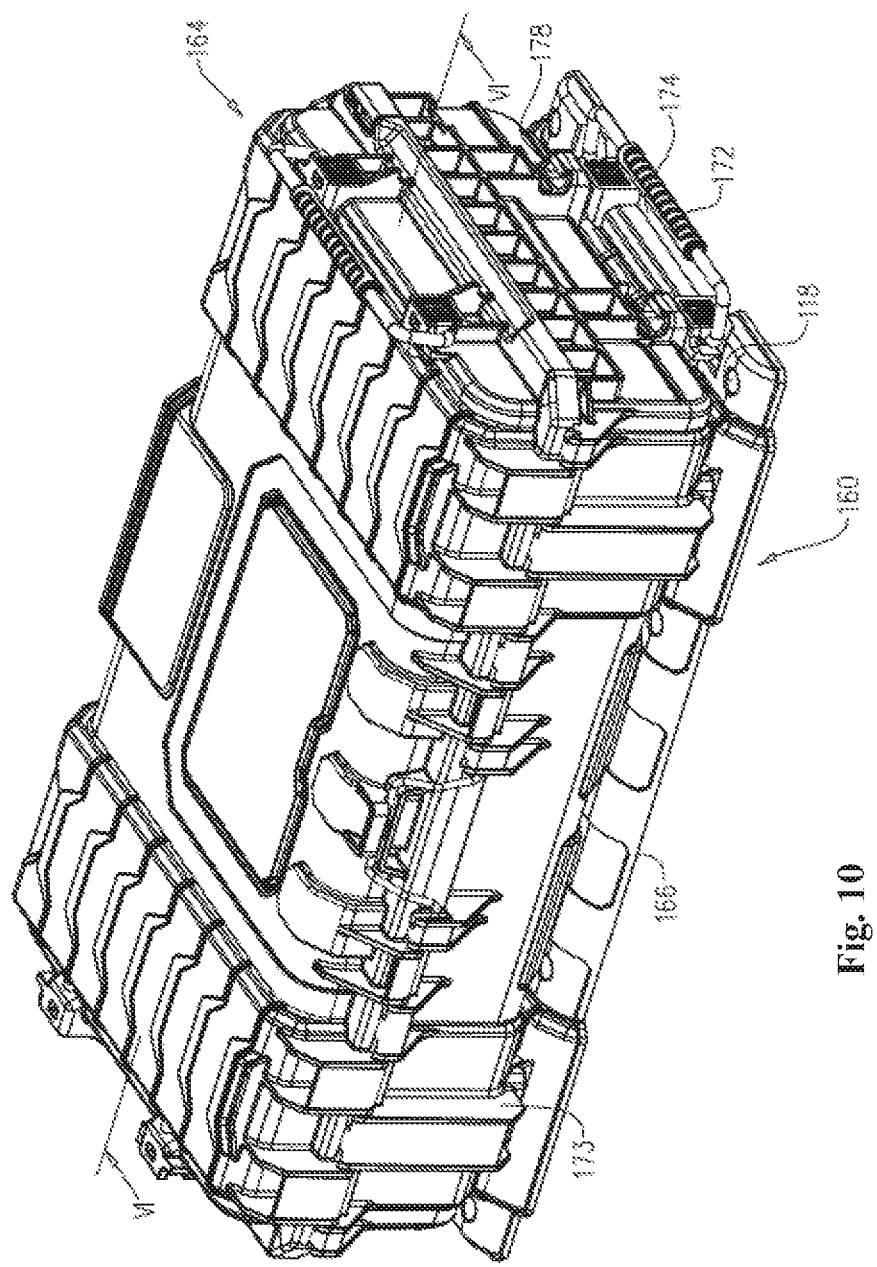
FIG. 10 is a top perspective vie of a container articulated over a mounting platform.
Figure 11A:
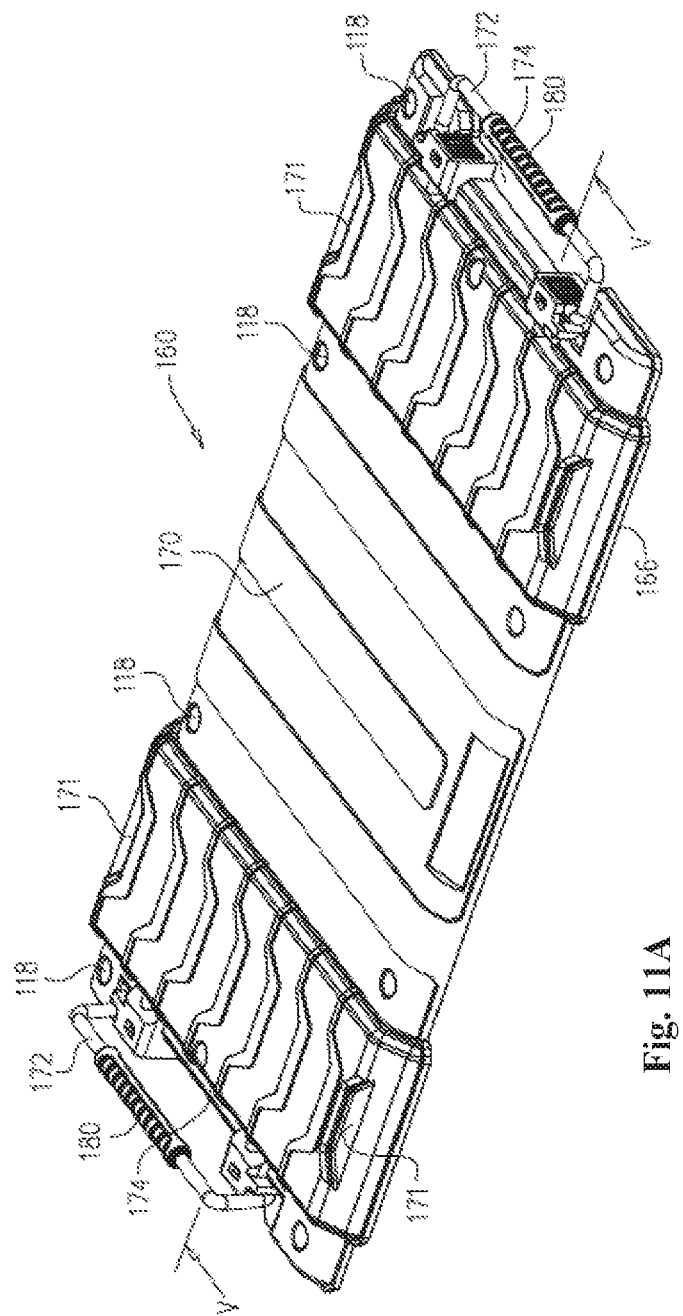
FIGS. 11A and 11B are a top perspective view and a bottom perspective view, respectively, of the mounting platform seen in FIG. 10.
Figure 11B:
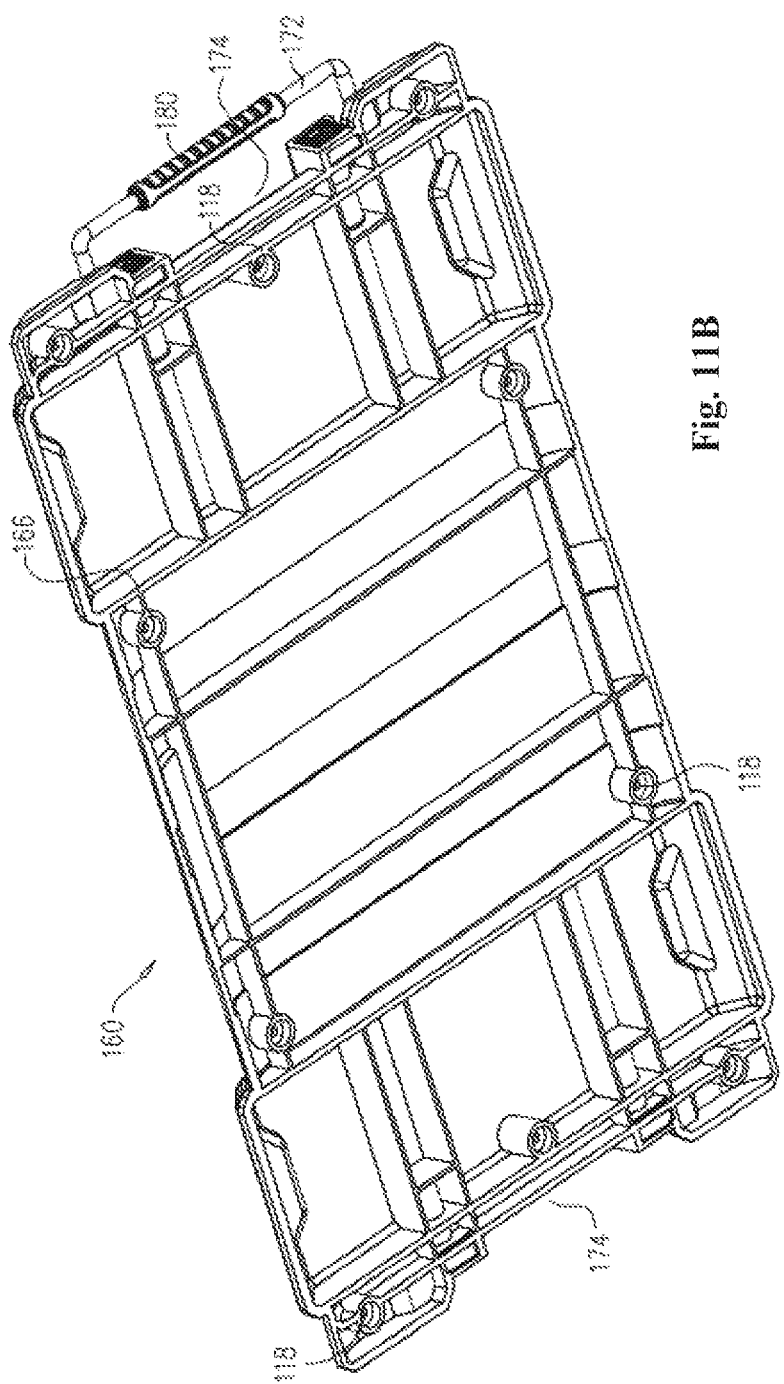
Figure 12:
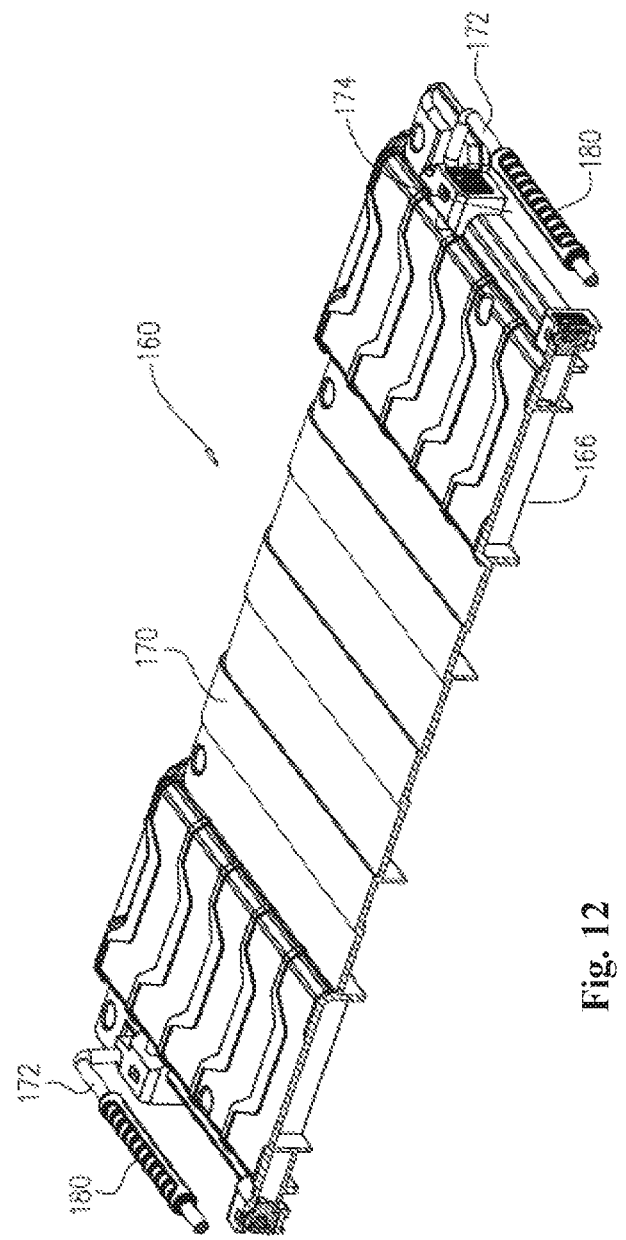
FIG. 12 is a longitudinal section along line V-V in FIG. 11A.
Figure 13:
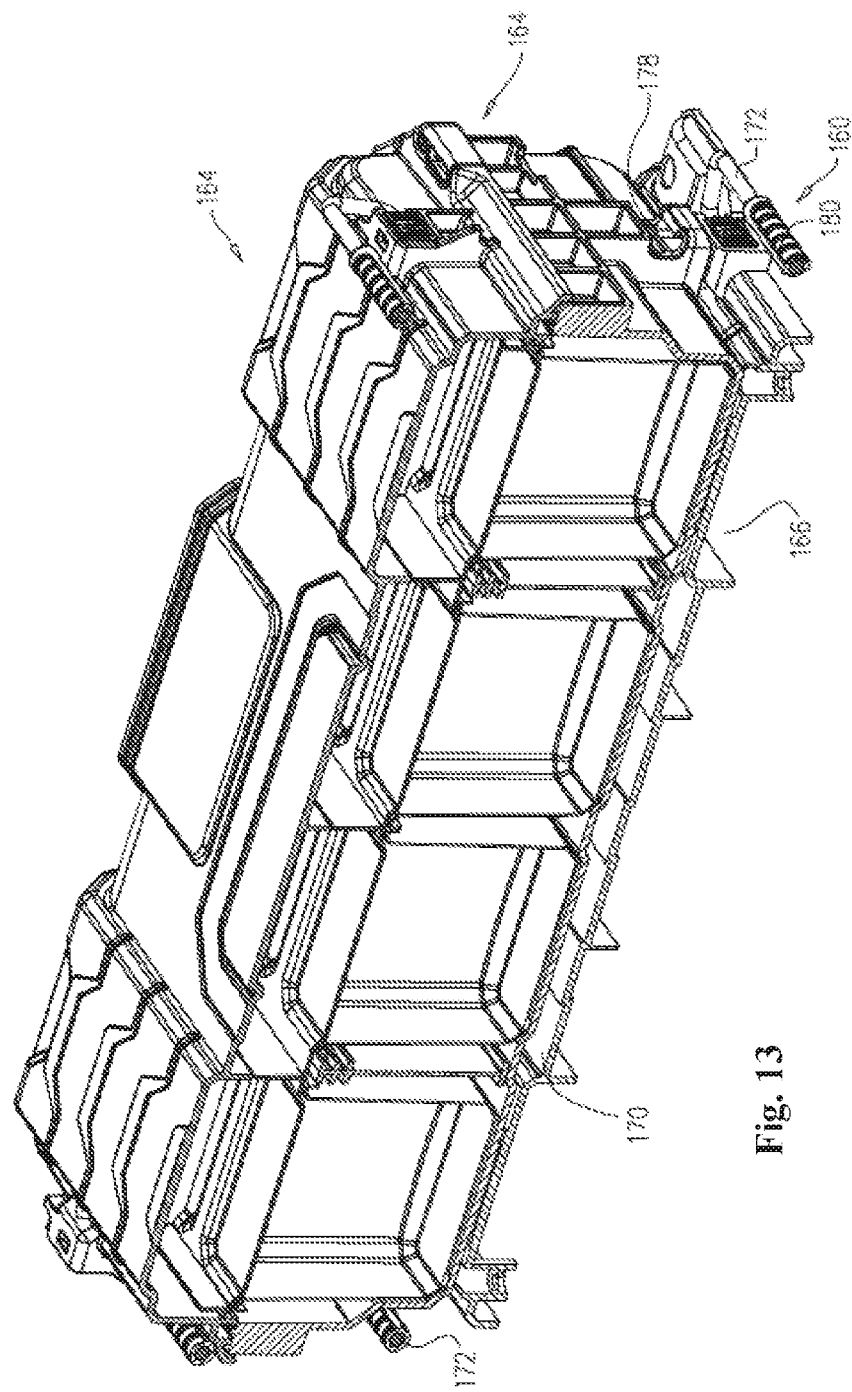
FIG. 13 is a longitudinal section along line VI-VI in FIG. 10.
Figure 14A:
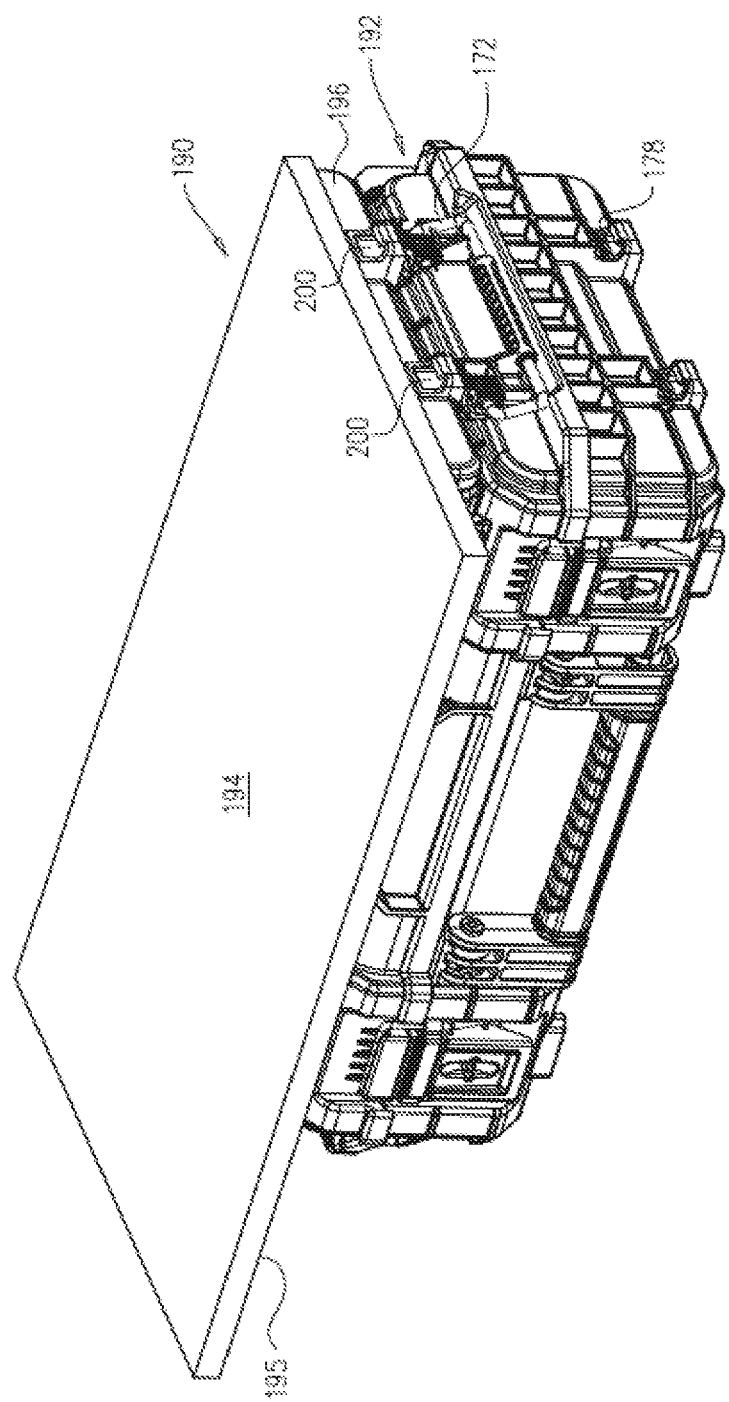
FIGS. 14A and 14B are a top perspective view and a bottom perspective view, respectively, of a workbench platform articulated over a container.
Figure 14B:
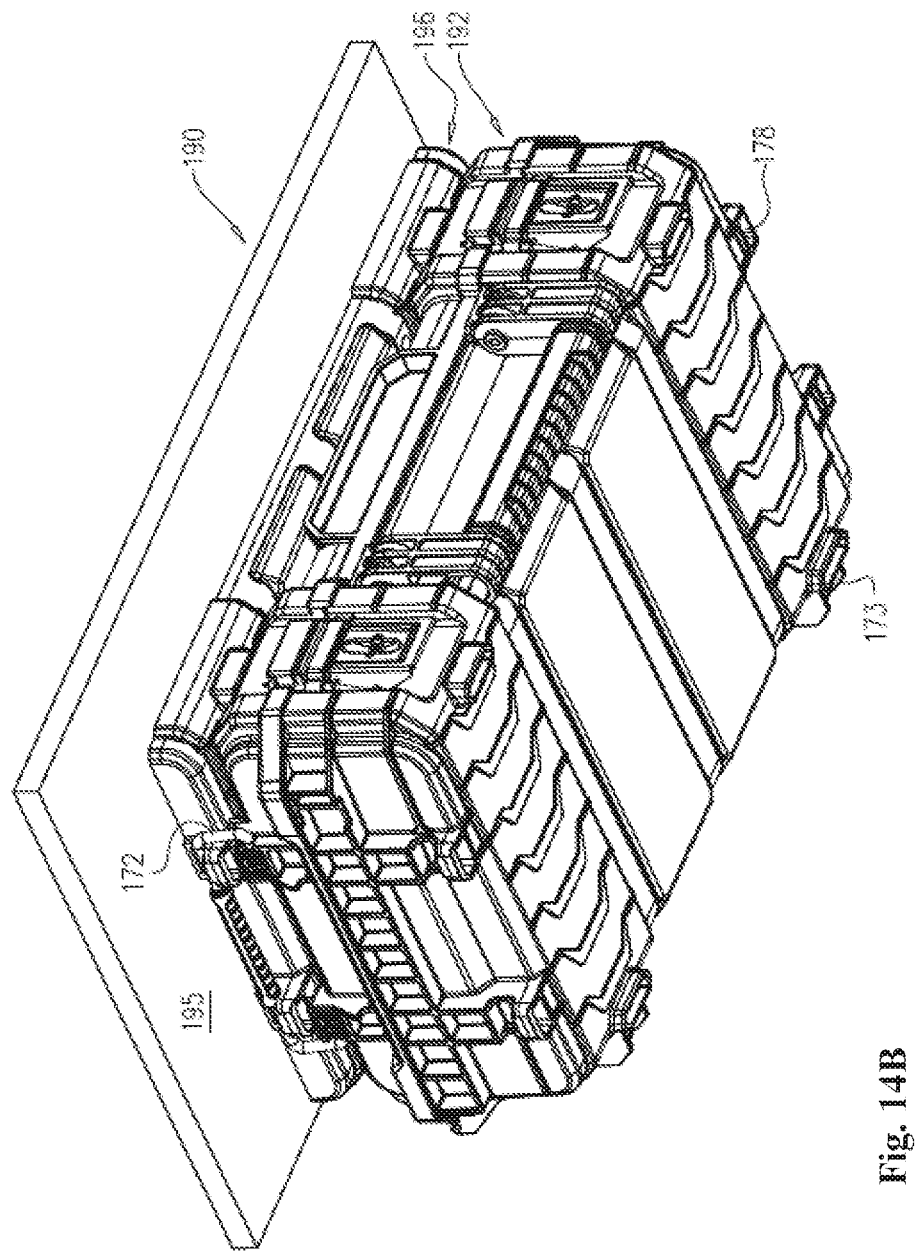
Figure 14C:
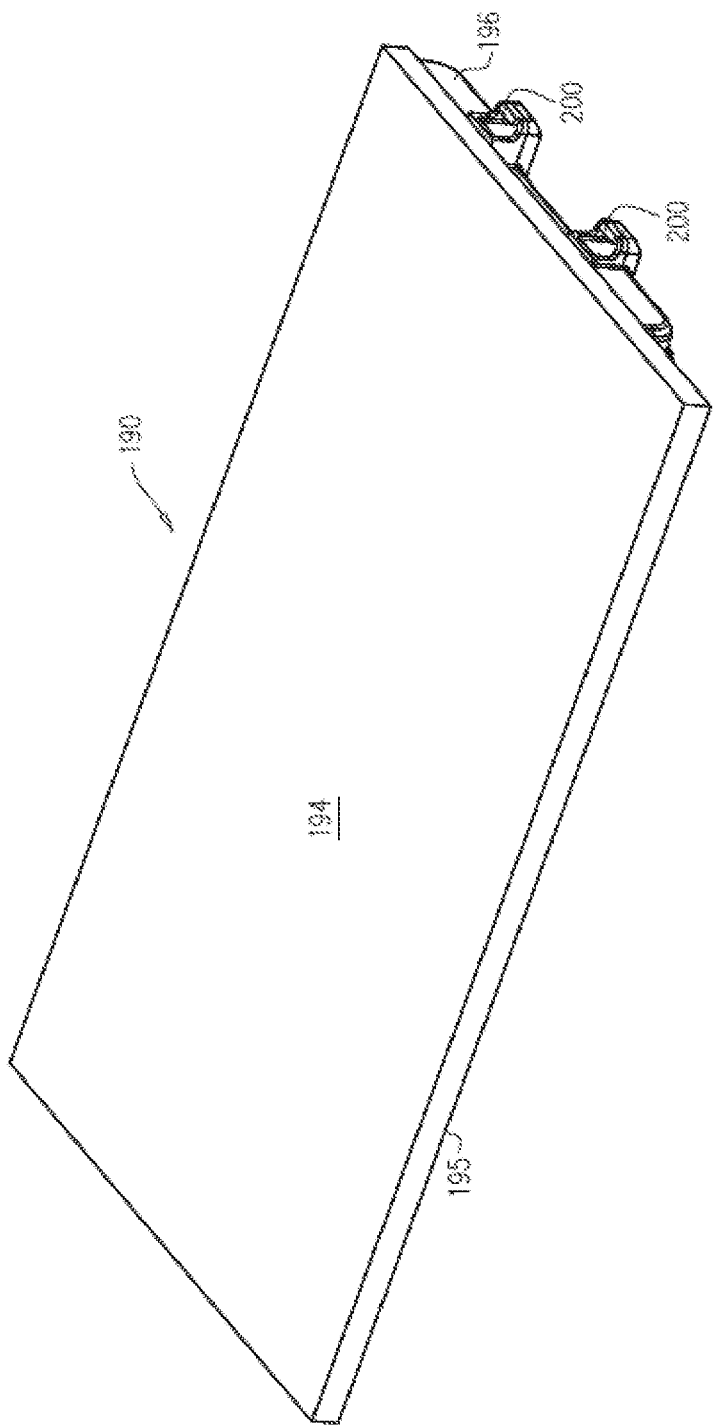
FIG. 14C is a top perspective view of the workbench platform seen in FIG. 14.

As seen in FIGS. 7B, 9A and 9B, the second utility unit, namely container 120, is configured at a base thereof with a bearing portion 130 having a bottom surface 132 and a rim 134 (peripheral in the present example), said bearing portion 130 shaped and sized for at least partial nesting within boundaries of a top nesting portion defined by a support rim 136 of a like container, at a stacked position (not shown), such that a bottom surface 132 of top container bears over a top surface 135 of a bottom container. The second utility unit 120 is configured at least at respective opposite sides of the bearing portion 130 with two locking receptacle 138 having a lateral opening.

Reverting to the pivoting latch members 114, the tongue-like locking latches 115 are displaceable through latch passages 140, wherein the locking latches 115 are displaceable between the locked position at which they project inwardly and over the support surface 111, and the unlocked position wherein the locking latches 115 are retracted, i.e. do not project over the support surface 111, at which position the latches are protected and are not exposed to undesired impact.

The arrangement is such that articulating the second utility unit 120 over the first utility unit 100 is facilitated by placing the former over the later such that the bottom surface 132 bears over the support surface 111, wherein the locking receptacles 138 are in register with the locking latches 115, whereby pivoting the latch members 114 into the locked position (FIGS. 7C, 7E, 7F and 8B), the locking latches 115 engage within the respective locking receptacle 138 of the second utility unit 120, such that the two utility units are articulately connected to one another.

At an unlocked position (FIGS. 8A to 8B) the locking members 114 are pivotally displaced outwards, wherein the locking latch 115 disengage from the respective locking receptacle 138, wherein the second container can be separated from the first container. It is noted that pivotal displacement of the pivoting latch members 114 is restricted within latch passages 140, whereby upon pivotal displacement of the latch members 114 into the fully open position a stopper portion 117 of the locking latches 115 encounters a wall surface 144 of a bridge portion.

The disclosed arrangement facilitates articulating a second utility unit over a first utility unit, the former having a smaller footprint than the latter.

With reference made to FIGS. 10 to 13, there is illustrated a first utility unit in form of a mounting platform 160, configured for articulation thereto a second utility unit in form of a container 164 (e.g. a tool box or the like).

The mounting platform 160 is made of rigid material and comprises a bottom face 166 suitable for mounting over any bearing surface such as a truck bed, a work station and the like, and securing thereto with bolts through a plurality of openings 118. A top face 170 (seen in FIGS. 11A and 12) of the mounting platform 160 mimics a top face of utility unit as disclosed hereinabove, e.g. dolly cart 12 of FIGS. 2A-2C, or a top face of a container as mentioned hereinbefore. The top face 170 is configured for bearing bottom surface portions of a second utility unit, and is further configured with several positioning locations, e.g. depressions 171 for receiving and positioning respective projections 173 of the second utility unit 164.

The mounting platform 160 is further configured with a pair of pivoting latch members 172, each pivotally articulated, within a niche 174 at opposite sides of the platform 160, pivoting latch members 172 configured for articulating with laterally extending locking retaining members 178 of the second utility unit 164. The pivoting latch members 172 are configured with a gripping portion 180 suited for comfort grabbing by an individual when carrying same, whereby the latch members constitute also carrying handles. The pivoting latch members 172 are pivotable between an unlocked/collapsed position (right side latch member in these Figures), and a locking position (left side latch member of the respective Figures).

When a second utility unit 164 is placed and positioned in register over the mounting platform 160, the latch members 172 can be pivoted into their locked position for arresting the locking retaining members 178 of the second utility unit.

FIGS. 14A to 16 illustrate a second utility unit being a workbench platform 190 mountable over a first utility unit, which in the present example is a container 192 (though it could just as well be any other utility unit (e.g. mounting platform 160 of the previous example, or other types of containers, etc.). The workbench platform 190 comprises a flat top surface 194 and a flat bottom surface 195 (though these could be configured with various working/machining configurations common with working surfaces). An intercoupling unit 196 is configured at a bottom face, constituting an intercoupling unit for articulating the platform to a first utility unit as will be explained. The intercoupling unit 196 can be integral with the workbench or attached thereto, whereby at the event of wear of one surface, the work surface can be turned over and attached over the intercoupling unit 196 for using the opposite surface. It is also seen that the intercoupling unit 196 has a smaller footprint than the work surface, though other proportions are possible as well.

The intercoupling unit 196 disposed below the work surface is configured at opposite sides thereof with laterally extending locking retaining members 200, similar to hook-like members 94 (FIGS. 6A-6B) or locking retaining members 178 (FIGS. 10, 13, 14A and 14B). Once the workbench platform 190 is placed over the first utility unit, e.g. container 192, or mounting platform 160 (FIG. 11A), the pivoting latch members 172 can be pivotally displaced into their respective locked position (FIG. 14B) for articulating the workbench platform 190 over the first utility unit.

Figure 16:
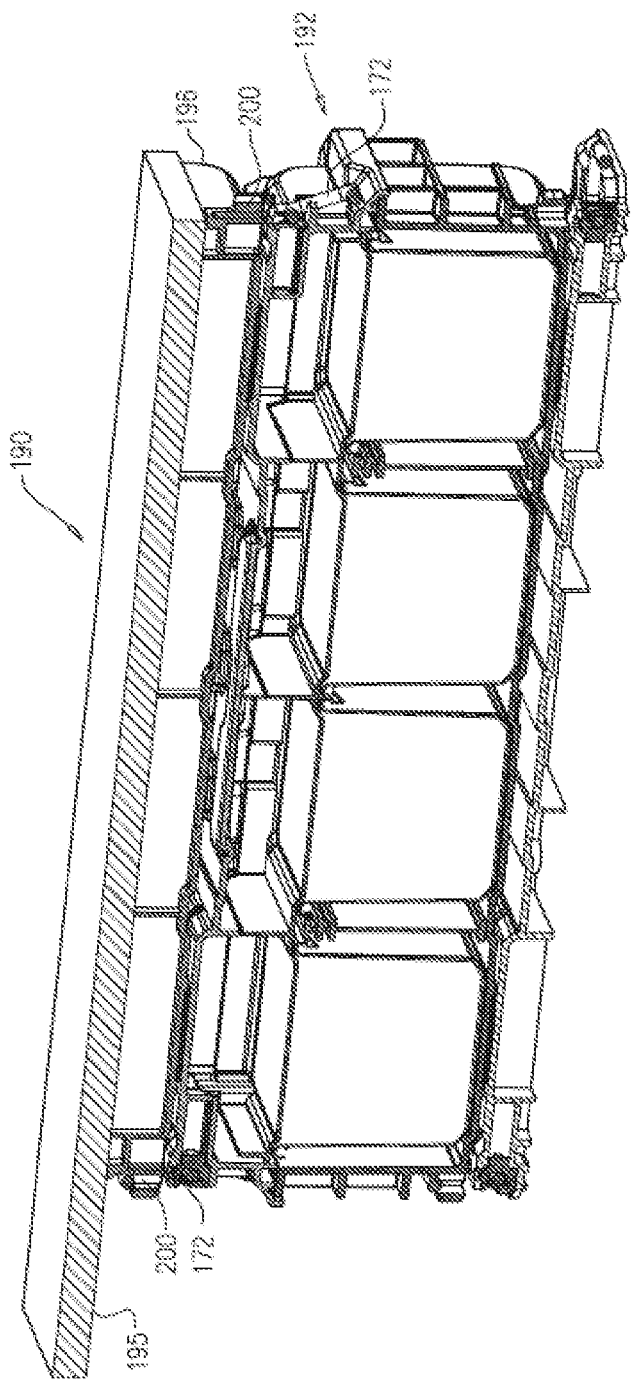
FIG. 16 is a sectioned view along line VII-VII of the assembly seen in FIG. 15.

In FIGS. 15 and 16 the workbench platform 190 constitutes a second utility unit articulated over a container 192 constituting a first utility unit with respect thereto, whilst the container 192 is in turn is articulated over a mounting platform 160 which constitutes a first utility unit with respect to the container 192 (which is then the second utility unit, respectively).

The invention claimed is:

1. A utility connectivity system comprising:
a first utility unit configured at a top portion thereof with a pair of pivoting latch members, each disposed near an opposite end of the first utility unit; and
a second utility unit configured at a bottom portion thereof with a pair of spaced apart locking retaining members for detachable articulation with the pivoting latch members of the first utility unit, said first utility unit configured with a top bearing face and said second utility unit configured with a bottom bearing face, whereby the pivoting latch members can be arrested by the locking retaining members when the bottom bearing face bears over the top bearing face, wherein the pivoting latch members are disposed at a top surface portion of the first utility unit, and the locking retaining members are disposed at a bottom surface portion or a bottom wall portion of the second utility unit, and wherein the first utility comprises at least one pair of latch members being pivotally displaceable about a first axis, between a locking position at which each of said latch members is engageable with a retaining member configured on a respective bottom portion of the second utility unit, and a stowed position at which said latch members are embedded within a latch receptacle of the first utility unit, the latch receptacle being a depression formed at a top surface of the first utility unit, and further wherein each of the latch members extend within its respective latch receptacle at both the locking position and the stowed position, such that when at the locking position only a locking tongue of the latch member projects above the top surface of the first utility unit so as to facilitate engaging with the locking retaining members, and at the stowed position said latch members substantially do not project from the top surface of the first utility unit.

2. The utility connectivity system of claim 1, wherein displacing the pair of latch members into the locking position takes place by pivotal displacement along said first axis, in opposite senses, towards one another, wherein one latch member of the pair pivots in a clockwise direction and the other latch of the pair pivots in a counterclockwise direction.

3. The utility connectivity system of claim 1, wherein the latch receptacle is a depression formed at a top surface of (i) the first utility unit defined between four side walls and a bottom wall, or (ii) a locomotion body defined by three walls and a bottom wall, and opens towards a side wall of the locomotion body.

4. The utility connectivity system of claim 1, comprising a locomotion assembly wherein the first utility unit is a locomotion body, whereupon mounting and articulating the second utility unit over the locomotion body facilitates wheeled locomotion of the locomotion assembly.

5. The utility connectivity system of claim 4, wherein the locomotion assembly comprises a locomotion body and at least one container detachably attachable over said locomotion body, configured for locomoting the at least one container.

6. The utility connectivity system of claim 4, wherein the locomotion body is configured at a bottom surface thereof with at least a first pair of wheels, and at a top portion thereof with a container coupling system, said container coupling system comprising at least one pair of latch members being pivotally displaceable about a first axis, between a locking position at which each of said latch members is engageable with a retaining member configured on a respective bottom portion of a container, and a stowed position at which said latch members are embedded within a latch receptacle of the locomotion body, each of the latch members extend within its respective latch receptacle at both the locked position and the stowed position.

7. The utility connectivity system of claim 6, wherein the locomotion body is a container and the top surface is a top cover surface of the container, said top cover being pivotally hinged to a container body, wherein said cover is displaceable between a closed position and an open position, and further wherein a bottom surface of a base of the container is the bottom surface of said locomotion body.

8. The utility connectivity system of claim 6, wherein the locomotion body is a dolly cart comprising a top surface, a bottom surface and side walls, said bottom surface is configured with two pairs of wheels.

9. The utility connectivity system of claim 6, wherein the at least one pair of wheels is disposed on an axis parallel to the first axis of pivot of the latch members.

10. The utility connectivity system of claim 1, wherein the first utility unit is a mounting platform comprising a bottom face configured for articulation to a surface and a top bearing face for detachably articulating thereto a second utility unit, said mounting platform further configured with a pair of pivoting latch members for articulating with locking retaining members of a second utility unit.

11. The utility connectivity system of claim 1, wherein the latch members are configured parallel to narrow side walls of the first utility unit.

12. The utility connectivity system of claim 1, wherein when the top bearing surface is unoccupied by a second utility unit, the latch members are pivotable into the locking position to facilitate as carrying handles for carrying the first utility unit.

13. The utility connectivity system of claim 1, wherein the latch members of the first utility unit are configured for arresting with respective locking retaining members of the second utility unit, wherein the locking retaining members are a lateral projection configured with a hook-like portion for arresting the latch member, said locking retaining members being integrally formed on and outwardly protruding from respective side walls or from a bottom surface of the second utility unit.

14. The utility connectivity system of claim 1, wherein the second utility unit is a workbench unit detachably attachable over the first utility unit.

15. The utility connectivity system of claim 14, wherein the workbench unit comprises a workbench platform and a connectivity unit, said connectivity unit configured at a bottom portion thereof with a pair of spaced apart locking retaining members for detachable articulation with the pivoting latch members of the first utility unit, and wherein said workbench platform is integral with or attached to said connectivity unit.

16. The utility connectivity system of claim 1, wherein a top surface of the first utility unit and a bottom surface of the second utility unit are configured with mating positioning members so that the second utility unit can be seated over the first utility unit at predefined position.

17. The utility connectivity system of claim 1, wherein the latch members are configured inwards from side edges of the top surface of the first utility unit.

18. The utility connectivity system of claim 1, wherein a latch member is configured as a retrofit mounting unit on the first utility unit.

* * * * *